(12) United States Patent
Hetling et al.

(10) Patent No.: US 12,514,484 B2
(45) Date of Patent: Jan. 6, 2026

(54) SYSTEMS, DEVICES, AND METHODS FOR ELECTROPHYSIOLOGICAL RECORDING FROM THE EYE

(71) Applicant: Retmap, Inc., Chicago, IL (US)

(72) Inventors: John R. Hetling, Dyer, IN (US); Shresta Patangay Hetling, Chicago, IL (US)

(73) Assignee: RETMAP, INC., Chicago, IL (US)

( * ) Notice: Subject to any disclaimer, the term of this patent is extended or adjusted under 35 U.S.C. 154(b) by 0 days.

(21) Appl. No.: 18/883,279

(22) Filed: Sep. 12, 2024

(65) Prior Publication Data

US 2025/0082255 A1    Mar. 13, 2025

Related U.S. Application Data

(60) Provisional application No. 63/537,955, filed on Sep. 12, 2023.

(51) Int. Cl.
*A61B 5/398* (2021.01)
*A61B 5/00* (2006.01)
(Continued)

(52) U.S. Cl.
CPC .............. *A61B 5/398* (2021.01); *A61B 5/251* (2021.01); *A61B 5/26* (2021.01); *A61B 5/297* (2021.01);
(Continued)

(58) Field of Classification Search
CPC ........... A61B 5/398; A61B 5/251; A61B 5/26; A61B 5/297; A61B 5/6821; A61B 2562/16; A61B 2562/0209
See application file for complete search history.

(56) References Cited

U.S. PATENT DOCUMENTS

| | | | |
|---|---|---|---|
| 3,001,441 A | 9/1961 | Frederick | |
| 3,929,124 A | 12/1975 | Yablonski et al. | |

(Continued)

FOREIGN PATENT DOCUMENTS

| | | |
|---|---|---|
| CN | 218767660 U | 3/2023 |
| JP | H01158937 A * | 6/1989 |

(Continued)

OTHER PUBLICATIONS

International Search Report and Written Opinion Mailed Dec. 17, 2024 In App. PCT/US2024046415.

(Continued)

*Primary Examiner* — Abid A Mustansir
(74) *Attorney, Agent, or Firm* — PERKINS COIE LLP

(57) ABSTRACT

Systems, devices, and methods for electrophysiological recording from the eye are disclosed herein. An electroretinography device can detect a biopotential signal from an eye of a subject and transmit the same to a processor. Embodiments of the present technology include one or more features directed to improving the use and operability of an electroretinography device. For example, the device can include features for (i) improving the quality of light stimulus delivered to the eye or (ii) providing a better fit around the eye or a contact lens worn on the eye. These features can account for anatomical differences between different subjects by either masking or accommodating such differences.

10 Claims, 21 Drawing Sheets

(51) Int. Cl.
  *A61B 5/251* (2021.01)
  *A61B 5/26* (2021.01)
  *A61B 5/297* (2021.01)

(52) U.S. Cl.
  CPC ........ *A61B 5/6821* (2013.01); *A61B 2562/16* (2013.01)

(56) References Cited

U.S. PATENT DOCUMENTS

| | | | |
|---|---|---|---|
| 5,022,749 | A | 6/1991 | Ogura |
| 5,032,020 | A | 7/1991 | Robert |
| 5,154,174 | A | 10/1992 | Hawlina |
| 5,297,554 | A | 3/1994 | Glynn et al. |
| 8,090,426 | B2 | 1/2012 | Felder |
| 8,326,935 | B2 | 12/2012 | Wu |
| 8,985,763 | B1 * | 3/2015 | Etzkorn ............. G02C 11/00 351/159.73 |
| 9,026,189 | B2 | 5/2015 | Garcia et al. |
| 10,952,630 | B2 | 3/2021 | Hetling et al. |
| 11,766,208 | B2 | 9/2023 | Hetling et al. |
| 2007/0093796 | A1 | 4/2007 | Raksi et al. |
| 2008/0294066 | A1 * | 11/2008 | Hetling ............. A61B 5/297 600/558 |
| 2014/0200424 | A1 | 7/2014 | Etzkorn et al. |
| 2014/0371565 | A1 * | 12/2014 | Glasser ............. A61B 5/6821 600/383 |
| 2015/0029463 | A1 * | 1/2015 | Hetling ............. A61B 5/398 351/219 |
| 2021/0219905 | A1 | 7/2021 | Hetling et al. |

FOREIGN PATENT DOCUMENTS

| | | |
|---|---|---|
| WO | 2013124141 A1 | 8/2013 |
| WO | 2015190706 A1 | 12/2015 |

OTHER PUBLICATIONS

"MIT's Material Property Database", MIT's Material Property Database; 2004; URL: www.mit.edu/~6.777/matprops/pdms.htm.
"PET (polyethylene terepththalate)", PET (polyethylene terepththalate), Designerdata, retrieved May 6, 2020 from internet, URL: https://designerdata.nl/materials/plastics/thermo-plastics/polyethylene-terephthalate, 3 pages.
Burian, Hermann, et al., "A Speculum Contact Lens Electrode for Electroretinography", Burian, Hermann et al., "A Speculum Contact Lense Electrode for Electroretinography", 1954; Electroencephalography and Clinical Neurophysiology, vol. 6, p. 509.
Lehman, Richard, "Overview of Glass Properties", Lehman, "Overview of Glass Properties", 2003.

* cited by examiner

SYSTEMS, DEVICES, AND METHODS FOR ELECTROPHYSIOLOGICAL RECORDING FROM THE EYE

CROSS-REFERENCE TO RELATED APPLICATIONS

The present application claims the benefit of U.S. Provisional Patent Application No. 63/537,955, filed Sep. 12, 2023, the disclosure of which is incorporated herein by reference in its entirety.

TECHNICAL FIELD

This present disclosure relates to system, devices, and methods for electrophysiological recordings from the eye.

BACKGROUND

The retina is the thin sheet of neural tissue that lines the inside of the eye, and which is responsible for converting the light that enters the eye into visual information that is then passed to the brain in the form of nerve impulses. Electroretinography (ERG) is the process of recording the bioelectric response of the retina in response to a visual stimulus, such as a brief flash of light. The response that is recorded when performing electroretinography is a voltage versus time waveform that can be analyzed to reveal a great deal of information about the physiology and health of the retina. ERG recording is therefore a commonly employed technique in vision science and ophthalmology. For instance, in ophthalmology, ERG recording can be used to diagnose a disease that affects the retina, such as glaucoma, or to monitor the effects of a treatment strategy aimed at a halting or reversing the damage caused by a retinal disease. ERG recording is non-invasive and is routinely performed in human subjects and animals such as mice, rats and cats.

ERG recording is accomplished by placing a recording electrode in gentle contact with the cornea, and then presenting a visual stimulus to the subject. The recording electrode can take one of several different forms. Current reusable electroretinography devices can be expensive, scarce in the market, difficult to clean for reuse, uncomfortable for the subject, difficult to insert on the eye, and pose a risk of corneal abrasion due to the stiff materials used for construction. Current disposable electroretinography devices are typically highly unstable on the eye and produce inconsistent signals. Therefore, improved electroretinography devices are needed.

BRIEF DESCRIPTION OF THE DRAWINGS

Features, aspects, and advantages of the presently disclosed technology may be better understood with regard to the following drawings.

Figure 1A:
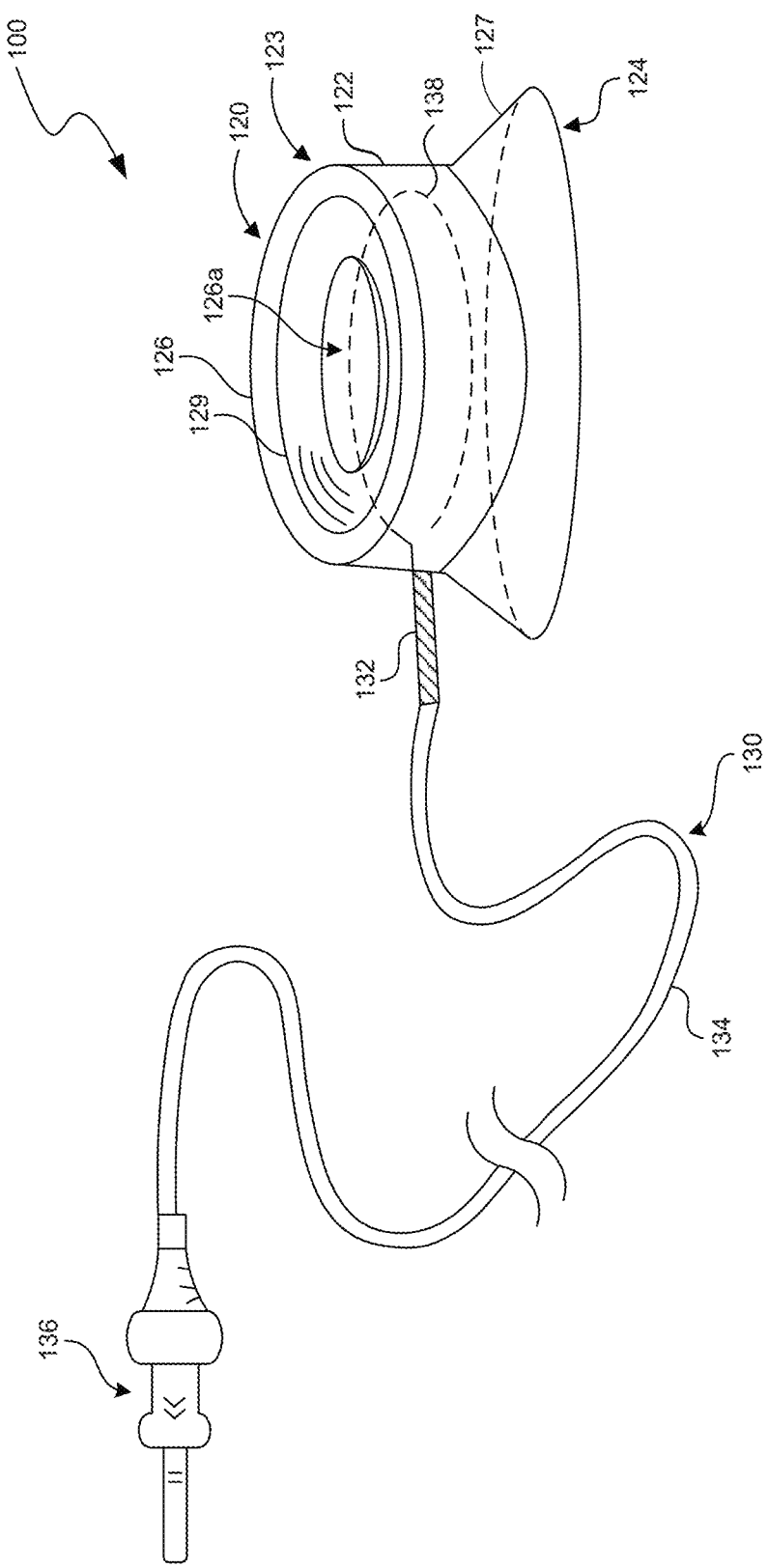
FIG. 1A is a top perspective view of an electroretinography device, configured in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present technology relate to systems, devices, and methods for electrophysiological recording from the eye. Electroretinography devices can be configured to detect a biopotential signal from an eye of a subject or a portion thereof (e.g., the retina) and transmit the same to a processor. In some embodiments, an electroretinography device can include an ocular member including a conductive element and a signal relay operatively connecting the conductive element and a signal processor. The use of an electroretinography device, however, may cause discomfort to the subject and/or provide inconsistent measurements across different subjects. For example, an electroretinography device that covers a large portion of the subject's eye can trap natural or artificial tears between the device and the eye, negatively affecting the visual acuity of the subject, which can invalidate measurements. In another example, the use of a fully transparent electroretinography device can cause inconsistent measurements between different subjects as well as different measurements of the same subject due to varying pupil diameter. In another example, a film of an electroretinography device may not properly conform to the subject's cornea or to a contact lens worn by the subject, negatively affecting the visual acuity of the subject or causing discomfort. In yet another example, an electroretinography device may stick to another electroretinography device or other object, making the cleaning process and other uses difficult.

Embodiments of the present technology address at least some of the above described issues. For example, embodiments of the present technology include an electroretinography device configured to remove tears and other fluids from between the device and the subject's eye. The device can comprise an ocular member including a proximal portion comprising a proximal outer surface extending radially inward along a distal direction and a proximal inner surface opposite the outer surface, wherein, when the ocular member is disposed over the eye, the proximal inner surface is disposed over an anterior surface of the eye and the proximal outer surface is positioned adjacent an eyelid of the subject, wherein the proximal inner surface includes a recess feature configured to receive tears from the eye, and a distal portion coupled to the proximal portion, wherein the distal portion comprises a distal outer surface extending radially outward in the distal direction, and a distal inner surface opposite the distal outer surface and defining at least in part a distal recess.

Embodiments of the present technology also include an electroretinography device configured to improve the quality of the light stimulus delivered to the eye. The device can comprise an ocular member including a proximal portion, a distal portion coupled to the proximal portion, and a film. The proximal portion can comprise a proximal outer surface extending radially inward along a distal direction and a proximal inner surface opposite the proximal outer surface. When the ocular member is disposed over the eye, the proximal inner surface is disposed over an anterior surface of the eye and the proximal outer surface is positioned adjacent an eyelid of the subject. The distal portion can comprise a distal outer surface extending radially outward in the distal direction and a distal inner surface opposite the distal outer surface and defining a distal recess. The film can be positioned at the distal recess, and can have a concave shape configured to conform to at least a portion of a cornea of the eye. In some embodiments, an intermediate portion of the film has a first transparency, and a peripheral portion of the film has a second transparency less transparent than the first transparency.

Embodiments of the present technology also include an electroretinography device configured to provide a better fit around the subject's cornea or contact lens. The device can comprise an ocular member including a proximal portion and a distal portion coupled to the proximal portion. The proximal portion can comprise a proximal outer surface extending radially inward along a distal direction and a proximal inner surface opposite the proximal outer surface. When the ocular member is disposed over the eye, the proximal inner surface is disposed over an anterior surface of the eye and the proximal outer surface is positioned adjacent to an eyelid of the subject. The distal portion can comprise a distal outer surface extending radially outward in the distal direction and a distal inner surface opposite the distal outer surface and defining at least in part a distal recess. The recess can include an opening extending through the ocular member in the distal direction.

Embodiments of the present technology also include an electroretinography device configured to decrease suction force with another electroretinography device or other object, and also to provide tactile feedback to help users distinguish between the top and bottom sides of the electroretinography device. The device can comprise an ocular member including a proximal portion and a distal portion coupled to the proximal portion. The proximal portion can comprise a proximal outer surface extending radially inward along a distal direction, a proximal inner surface opposite the outer surface, and a proximal end surface extending between the proximal inner surface and the proximal outer surface. When the ocular member is disposed over the eye, the proximal inner surface is disposed over an anterior surface of the eye and the proximal outer surface is positioned adjacent an eyelid of the subject. The distal portion can comprise a distal outer surface extending radially outward in the distal direction, a distal inner surface opposite the distal outer surface and defining a distal recess, and a distal end surface extending between the distal inner surface and the distal outer surface. At least one of the proximal portion or the distal portion can include an interface feature configured to decrease contact area with another object.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

II. Electroretinography Device Overview

Figure 1B:
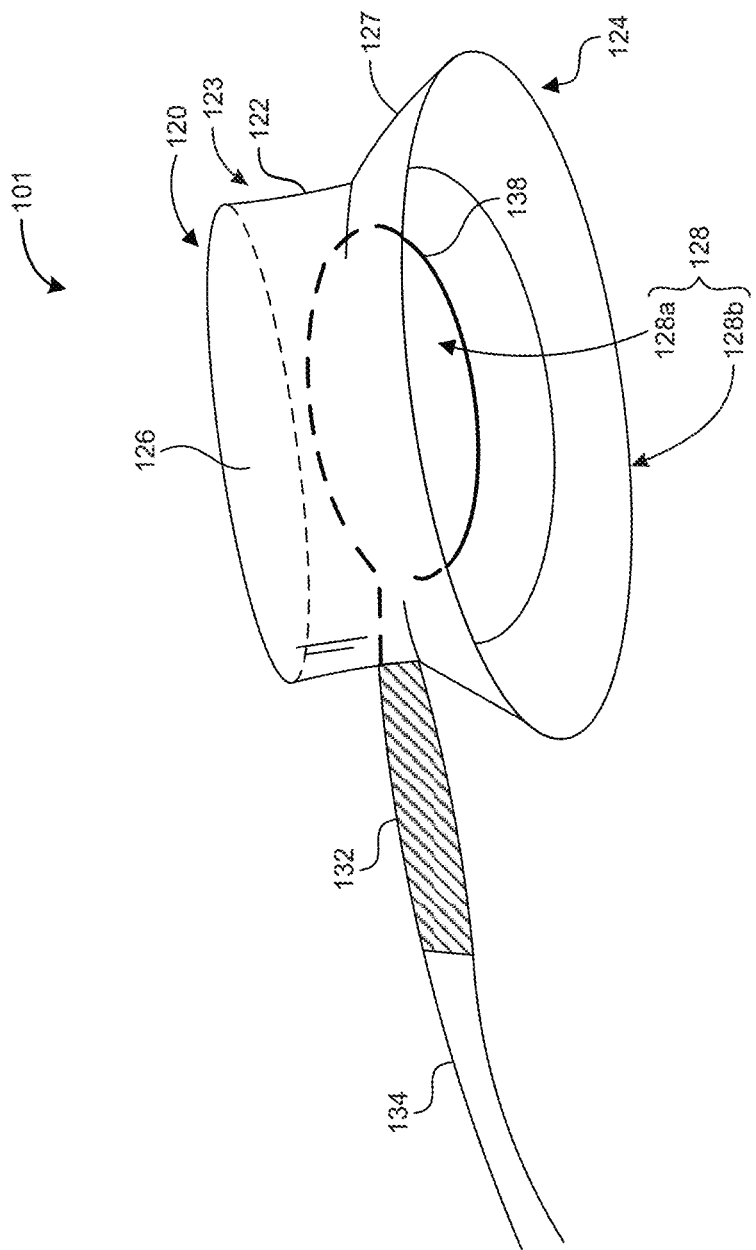
FIG. 1B is a bottom perspective view of another electroretinography device, configured in accordance with embodiments of the present technology.

FIG. 1A is a top perspective view of an electroretinography device 100 ("device 100"), configured in accordance with embodiments of the present technology, and FIG. 1B is a bottom perspective view of another electroretinography device 101 ("device 101"), configured in accordance with embodiments of the present technology. Referring to both FIGS. 1A and 1B, each of the devices 100, 101 includes an ocular member 120 including a proximal portion 124, a distal portion 123 coupled to the proximal portion 124, a conductive element 138 disposed and retained in an annular channel of the proximal portion 124, and a signal relay 130 (FIG. 1A) operatively connected to the conductive element 138. The signal relay 130 can include one or more wires 134 operatively connected to the conductive element 138, for example, via a flexible shield 132, and any suitable connector 136 operatively connected to the wire 134.

The proximal portion 124 can comprise a proximal outer surface 127 extending radially inward along a distal direction (e.g., from the proximal portion 124 toward the distal portion 123) and a proximal inner surface 128 (FIG. 1B) opposite the outer surface. In some embodiments, the proximal inner surface 128 includes a single contour that is complementary or substantially complementary to the curvature of at least a portion of the anterior surface of the eye. In some embodiments, as shown in FIG. 1B, the proximal inner surface 128 includes a cornea portion 128a and a sclera portion 128b at a proximal-most edge extending radially around and proximal to the cornea portion 128a. The sclera portion 128b can have a first cross-sectional dimension and the cornea portion 128a can have a second cross-sectional dimension smaller than the first cross-sectional dimension.

The distal portion 123 can comprise a distal outer surface 122 and a distal end surface 126. In the illustrated embodiments, the distal outer surface 122 includes a single, continuously curved side wall with a uniform cross-sectional profile, such as a circular, oval, ellipsoidal, or any other rounded cross-sectional profile. In some embodiments, the distal outer surface 122 includes a polygonal cross-sectional profile, such as a triangular, quadrilateral, pentagonal, hexagonal, heptagonal, octagonal, nonagonal, decagonal, or any other polygonal cross-sectional profile. In some embodiments, the distal outer surface 122 includes a cross-sectional profile including one or more curved segments and one or more flat segment (e.g., a half-circle with a flat edge). In some embodiments, the distal outer surface 122 has a cross-sectional profile that varies in shape and/or dimension. For example, the distal outer surface 122 can extend radially outward in the distal direction.

Referring to FIG. 1A, the distal end surface 126 includes a distal inner surface 129 opposite the distal outer surface 122 and defining at least in part a distal recess 126a. In some embodiments, the distal recess 126a has a concave form factor that does not extend through the ocular member 120. In some embodiments, the distal recess 126a includes a void (e.g., gap, hole, passage, channel) extending through the ocular member 120. The distal recess 126a can be incorporated before, during, or after formation of the ocular member 120. For example, in some embodiments, the distal recess 126a is formed in the ocular member 120 as part of a molding step. In some embodiments, the distal recess 126a is formed in the ocular member 120 after a molding step, for example, by drilling or milling the distal recess 126a into or through a molded ocular member 120. Referring to FIG. 1B, the distal end surface 126 includes a substantially flat surface without a distal inner surface or a distal recess. The distal end surface 126 can have any suitable shape, such as having a contour.

The ocular member 120 can be formed of any single or combination of suitable biocompatible materials. In some embodiments, the material is flexible to reduce (e.g., minimize) the risk of mechanical abrasion to the anterior surface of the eye and/or the eyelids when the device 100, 101 is positioned on the subject's eye. In some embodiments, the material has a Young's modulus of elasticity of less than about 40 mega-Pascals (MPa), 50 MPa, or 60 MPa. In some embodiments, the material has a Young's modulus of elasticity of about 0.05 MPa to about 4.0 MPa. In some embodiments, the material has a durometer value of less than about 60 on the Shore A scale. In some embodiments, the material is one commonly used in the manufacture of soft contact lenses (e.g., hydrogel or silicone hydrogel material). In some embodiments, the material includes cured liquid silicone rubber (e.g., polydimethylsiloxane ("PDMS")), which has a durometer value of about 30 on the Shore A scale. As explained elsewhere herein, all or one or more parts of the ocular member can include a transparent or translucent material to allow light to pass through, or an opaque material to prevent light from reaching certain parts of the eye. The ocular member 120 can be formed via any suitable fabrication technique depending on the type of materials selected for the ocular member 120. For example, the ocular member 120 can be molded (e.g., injection molded) when the ocular member 120 is formed predominantly of liquid silicone rubber.

The conductive element 138 can include one or more wires configured to detect a biopotential signal from the subject's eye (e.g., from the retina). Any suitable electrically conductive material can be used to form the one or more wires. For example, and without limitation, the conductive element 138 may comprise stainless steel, gold, platinum, conductive hydrogel, conductive polymer, conductive silicone, doped silicon, conductive saline, or combinations thereof. The conductive element 138 can be configured to form any suitable shape, such as a curved shape or a polygon. In the illustrated embodiments, the conductive element 138 forms a partial loop. The conductive element 138 can be incorporated into each of the devices 100, 101 before, during, or after formation of the ocular member 120. For example, in some embodiments, the conductive element 138 is placed into a mold before the material used to form the ocular member 120 is added to the mold. In other embodiments, the conductive element 138 is added to the ocular member 120 after a molding step.

During operation, each of the devices 100, 101 can be positioned such that, when the ocular member 120 is disposed over an eye of a subject, the proximal inner surface 128 is disposed over an anterior surface of the eye and the proximal outer surface 127 and/or the distal outer surface 122 is positioned adjacent to the subject's eyelid to prevent the eyelid from sliding over the ocular member 120. A light stimulus can be applied to the subject's eye through the distal end surface 126 and/or the distal recess 126a (FIG. 1B). As explained elsewhere herein, the ocular member 120 can include a transparent or translucent material to allow light to pass through and/or the distal recess 126a can include a void to allow the light to reach the subject's eye unobstructed. The conductive element 138 can be configured to receive a biopotential signal from the subject's eye. The signal relay 130 can be configured to transmit the biopotential signal from the conductive element 138 to a signal processor (not shown). The connector 136 can be any suitable electrical connector compatible with the signal processor in use. The signal processor can then analyze or otherwise process the biopotential signal from the subject's eye. Additional details regarding the device can be found in U.S. patent application Ser. No. 17/188,130, titled "DEVICE FOR ELECTROPHYSIOLOGICAL RECORDING FROM THE EYE," the disclosure of which is incorporated herein by reference in its entirety.

Figure 2A:
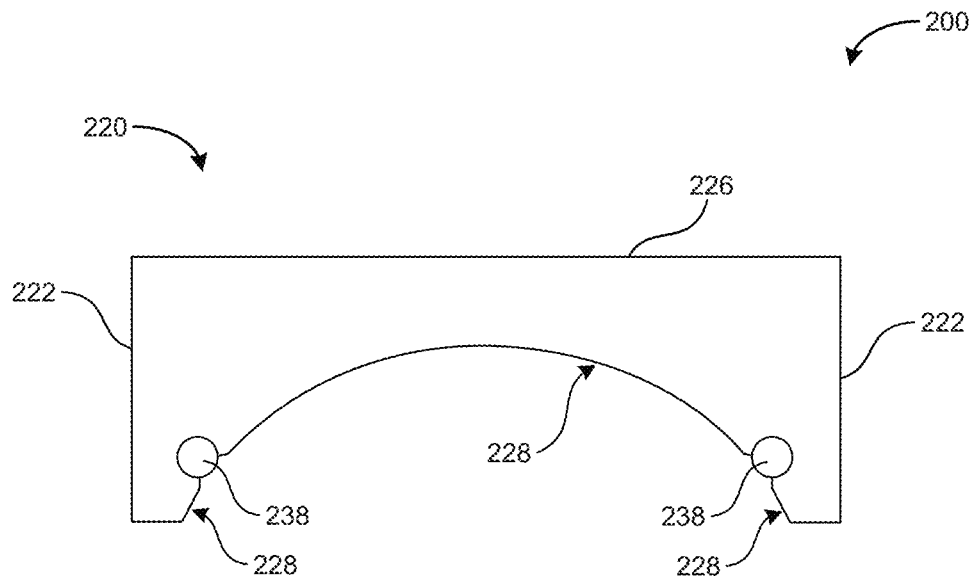
FIG. 2A is a cross-sectional view of an electroretinography device, configured in accordance with embodiments of the present technology.
Figure 2B:
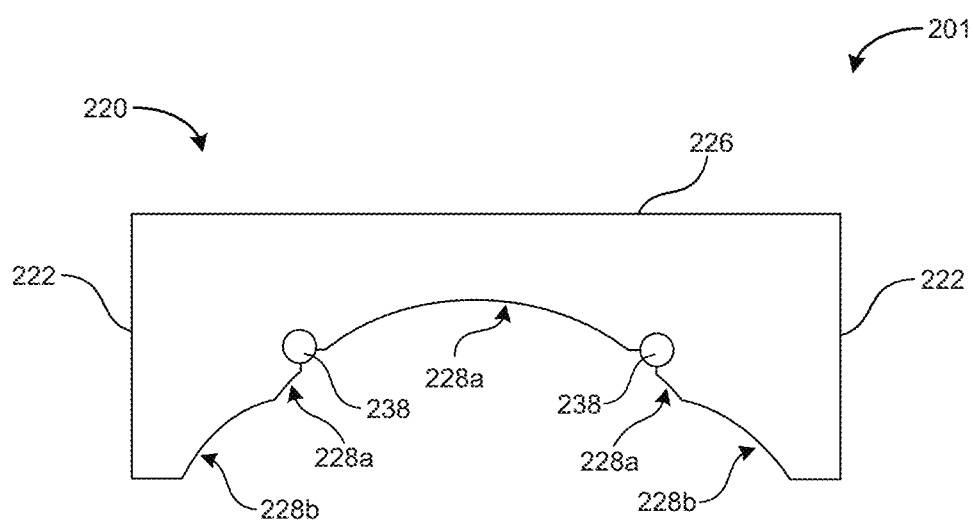
FIG. 2B is a cross-sectional view of another electroretinography device, configured in accordance with embodiments of the present technology.

FIG. 2A is a cross-sectional view of an electroretinography device 200, configured in accordance with embodiments of the present technology. FIG. 2B is a cross-sectional view of another electroretinography device 201, configured in accordance with embodiments of the present technology. Referring to FIGS. 2A and 2B together, each electroretinography device 200, 201 includes an ocular member 220 (e.g., the ocular member 120) comprising an outer surface 222 (e.g., the distal outer surface 122), a distal end surface 226 (e.g., the distal end surface 126) extending between the outer surface 222, and a conductive element 238 (e.g., the conductive element 138) disposed within the ocular member 220. In FIG. 2A, a proximal inner surface 228 (e.g., the proximal inner surface 128) has a single contour that is complementary or substantially complementary to the curvature of at least a portion of the anterior surface of the eye. In FIG. 1B, the proximal inner surface 128 includes a cornea portion 228a (e.g., the cornea portion 128a) and a sclera portion 228b (e.g., the sclera portion 128b), each having a contour that is complementary or substantially complementary to the curvature of at least a portion of the cornea and sclera of the eye, respectively. The sclera portion 228b can have a first cross-sectional dimension and the cornea portion 228a can have a second cross-sectional dimension smaller than the first cross-sectional dimension.

In both illustrated embodiments, the conductive element 238 is at least partially exposed through the proximal inner surface 228. The conductive element 238 can be positioned anywhere along the proximal surface 228. For example, in FIG. 2A, the conductive element 238 is positioned toward the proximal side and away from the distal side of the ocular member 220. In FIG. 2B, the conductive element 238 is positioned at the cornea portion 228a. In some embodiments, the conductive element 238 is over-molded and encased in the material forming the ocular member 220.

The single contour of the proximal inner surface 228 illustrated in FIG. 2A can reduce manufacturing complexity, while the cornea and sclera portions 228a, 228b illustrated in FIG. 2B can provide a better fit on a subject's eye. Furthermore, by at least partially exposing the conductive element 238 through the proximal inner surface 228, as opposed to completely embedding the conductive element 238 within the ocular member 220, the conductive element 238 can more reliably and consistently receive a biopotential signal from the subject's eye.

Figure 3:
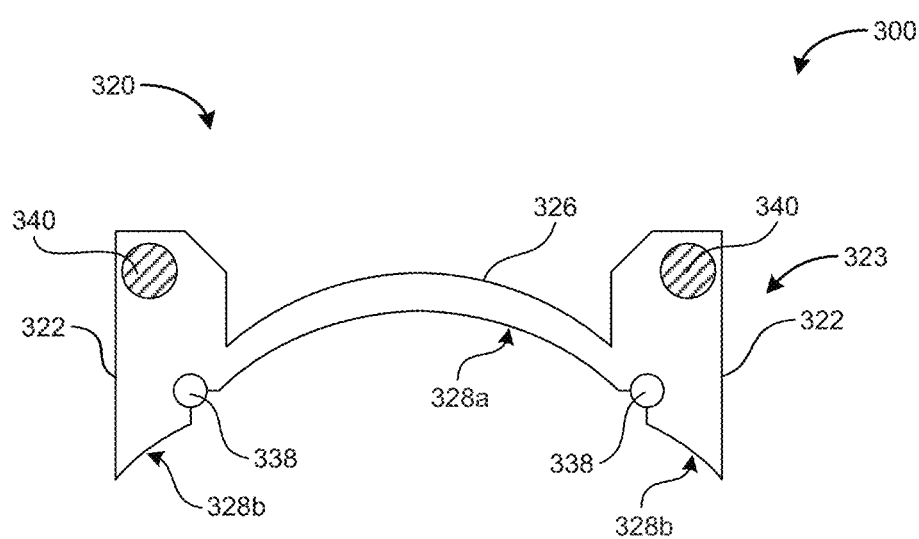
FIG. 3 is a cross-sectional view of an electroretinography device, configured in accordance with embodiments of the present technology.

FIG. 3 is a cross-sectional view of an electroretinography device 300, configured in accordance with embodiments of the present technology. The electroretinography device 300 includes an ocular member 320 (e.g., the ocular member 120) comprising a distal portion 323 (e.g., the distal portion 123) with an outer surface 322 (e.g., the distal outer surface 122) and a distal end or inner surface 326 (e.g., the distal end surface 126) extending between the outer surface 322 and having a generally convex shape, a stabilizing element 340 embedded within the ocular member 320, a proximal inner surface with a cornea portion 328a (e.g., the cornea portion 128a) and a sclera portion 328b (e.g., the sclera portion 128b), and a conductive element 338 (e.g., the conductive element 138) disposed within the ocular member 320 and at least partially exposed through and between the cornea and sclera portions 328a, 328b. In some embodiments, the conductive element 338 is over-molded and encased in the material forming the ocular member 320.

In some embodiments, the stabilizing element 340 is embedded within the ocular member 320 (e.g., along the top outer rim of the distal portion 323, as shown). In some embodiments, the stabilizing element 340 is at least partially exposed through the distal inner surface 326 and/or the outer surface 322. The stabilizing element 340 can have any suitable shape (e.g., annular) to provide rigidity to the ocular member 320, such as by resisting lateral forces exerted on the outer surface 322 by the subject's eyelid. In some embodiments, the stabilizing element 340 includes a material with a higher rigidity than the material from which the remainder of the ocular member 320 is made. In some embodiments, the material has a Young's modulus of elasticity greater than 80 MPa, 100 MPa, or 120 MPa. In some embodiments, the material includes tetrafluoroethylene (e.g., TEFLON), acetal resin (e.g., DELRIN), acrylic (e.g., poly(methyl methacrylate)), polycarbonate, glass, stainless steel, liquid silicone rubber with a Shore A durometer value greater than 50, or a combination thereof.

The dimensions of the stabilizing element 340 can be determined at least in part based on a difference between the Young's modulus value of the stabilizing element 340 and the Young's modulus value of the material forming the ocular member 320, and/or the shape and dimensions of the ocular member 320. A smaller stabilizing element 340 can be used when the difference in the Young's modulus values is large and when the ocular member 320 does not include voids or other discontinuities (e.g., the distal recess 126a). The stabilizing element 340 can be introduced into the electroretinography device 300 before, during, or after formation of the ocular member 320. For example, in some embodiments, the stabilizing element 340 is placed into a mold before the material used to form the ocular member 320 is added to the mold. In some embodiments, the stabilizing element 340 is added to the ocular member 320 after a molding step. It is appreciated that the stabilizing element 340 can be included in any one of the electroretinography devices described herein.

III. Electroretinography Systems and Devices for Removing Trapped Fluids

Figure 4A:
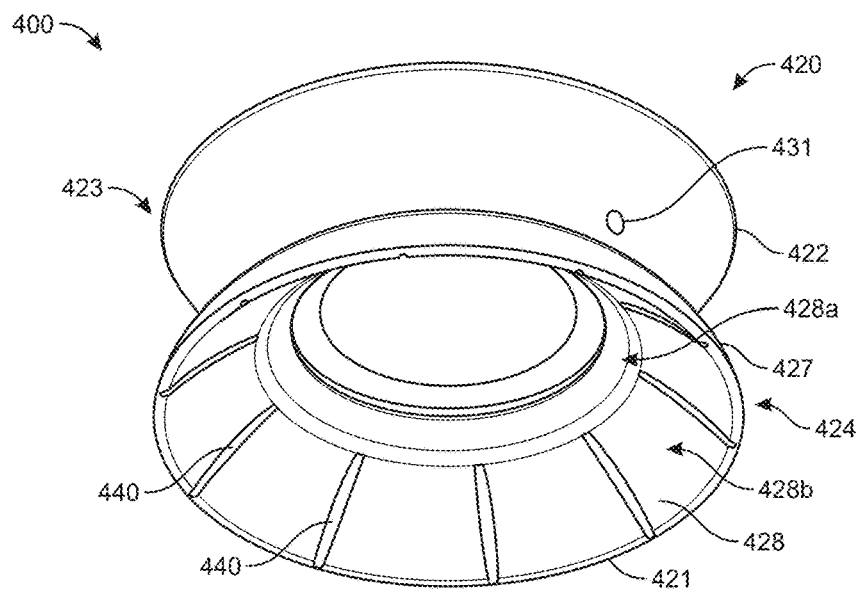
FIGS. 4A-C are bottom perspective, bottom, and side cross-sectional views, respectively, of an electroretinography device, configured in accordance with embodiments of the present technology.
Figure 4B:
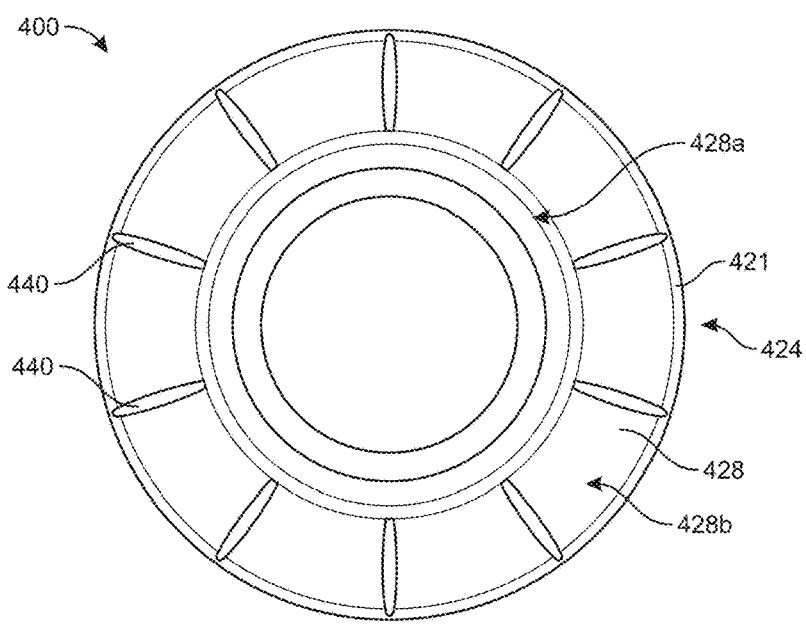
Figure 4C:
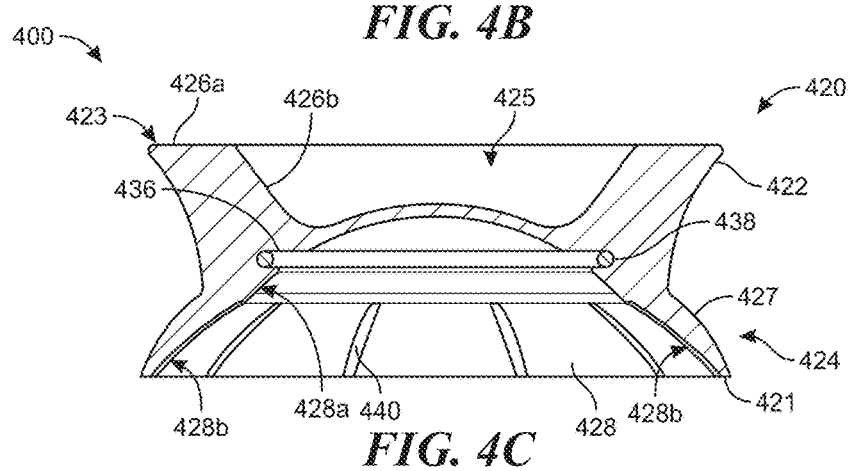

FIGS. 4A-C are bottom perspective, bottom, and side cross-sectional views, respectively, of an electroretinography device 400 ("device 400"), configured in accordance with embodiments of the present technology. Referring to FIGS. 4A-4C together, the device 400 comprises an ocular member 420 (e.g., the ocular member 120) including a proximal portion 424 (e.g., the proximal portion 124) and a distal portion 423 (e.g., the distal portion 123) coupled to the proximal portion 424. The device 400 can further include a conductive element 438 (e.g., the conductive element 138) disposed in an annular channel 436 (FIG. 4C) within the ocular member 420 and a signal relay (not shown) (e.g., the signal relay 130) operatively connected to the conductive element.

The proximal portion 424 comprises a proximal outer surface 427 extending radially inward along a distal direction (e.g., from the proximal portion 424 toward the distal portion 423) and a proximal inner surface (e.g., the proximal inner surface 128), including a cornea portion 428a (e.g., the cornea portion 128a), a sclera portion 428b (e.g., the sclera portion 128b), and an optional transition zone in between (collectively referred to as "proximal inner surface 428") opposite the proximal outer surface 427. The distal portion 423 comprises a distal outer surface 422 (e.g., the distal outer surface 122) extending radially outward in the distal direction, a distal end surface 426a extending generally perpendicular to the distal direction, and a distal inner surface 426b opposite the distal outer surface 422 and defining at least in part a distal recess 425. The distal portion 423 can also include an aperture 431 extending from the distal outer surface 422 to the annular channel 436 to allow electrical connection between the conductive element and the signal relay. In some embodiments, the aperture 431 is included elsewhere in the ocular member 420, such as through the proximal portion 424, or omitted.

The proximal inner surface 428 can include a recess feature 440. In the illustrated embodiment, the recess feature 440 comprises a plurality of grooves extending along the proximal inner surface 428. In the illustrated embodiments, the grooves extend from a proximal edge 421 of the sclera portion 428b to the cornea portion 428a in a generally radial direction. The recess feature 440 can include any number of grooves, such as at least one, two, three, four, five, 10, 15, or between 1 and 15. In some embodiments, the grooves extend in a direction different from the illustrated embodiment. The grooves can have identical, similar, or varying dimensions (e.g., length along the proximal inner surface 428, depth into the proximal portion 424, and/or width). Individual ones of the grooves can have a U-shaped, semi-circular, triangular, rectangular, or other cross-sectional profile that is constant or varies along the length of the groove. Conversely, the proximal outer surface 427 is smooth and/or does not include a plurality of grooves.

During operation, when the ocular member 420 is disposed over an eye, the proximal inner surface 428 is disposed over an anterior surface of the eye. Unlike conventional electroretinography devices, the proximal inner surface 428 can cover a substantial portion of the exposed eye, which can lead to trapping any natural or artificial tears and other fluids between the ocular member 420 and the eye. Such fluids, if trapped therebetween, can cause discomfort to the subject, distort the light stimulus entering the eye, cause slippage between the device 400 and the eye, and/or affect the visual acuity of the subject, potentially leading to inaccurate measurements by the device 400. The grooves of the recess feature 440 can trap the fluids and direct them (e.g., due to gravity, a pressure difference between the trapped fluids and the external environment, osmotic pressure, and/or capillary action) away from the cornea portion 428a and toward the proximal edge 421 of the ocular member 420 and a periphery of the subject's eye, where the fluid can evaporate, be wiped, or be absorbed. The grooves can be incorporated without undue manufacturing complexity, such as by including the grooves in the mold for the ocular member 420 or removing (e.g., cutting, carving) material from the ocular member 420 after molding.

Figure 5A:
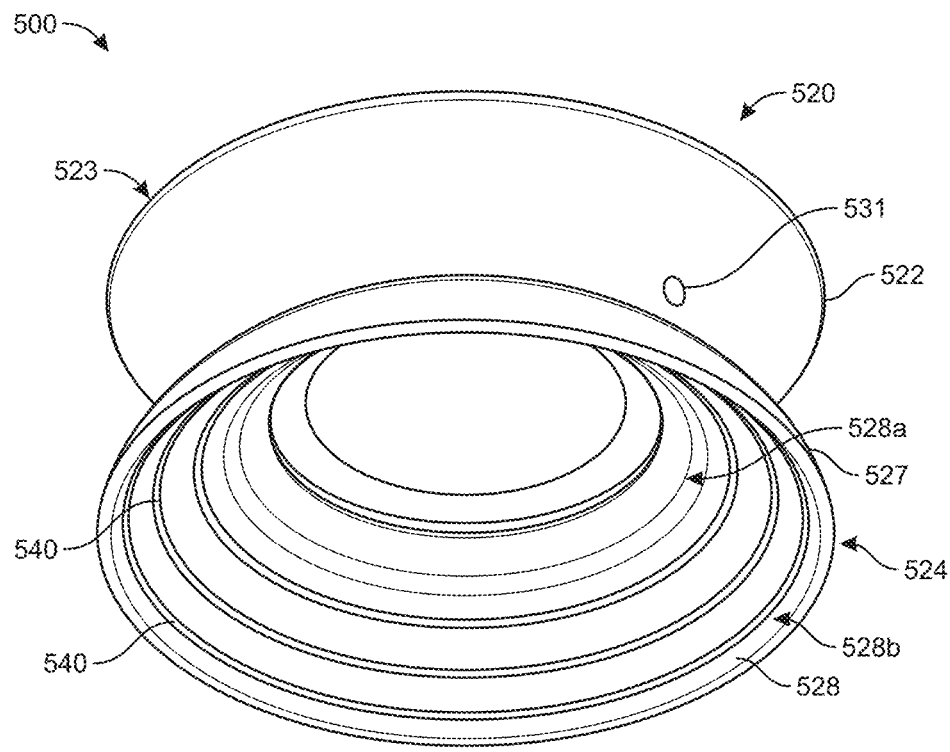
FIGS. 5A and 5B are bottom perspective and side cross-sectional views, respectively, of an electroretinography device, configured in accordance with embodiments of the present technology.
Figure 5B:
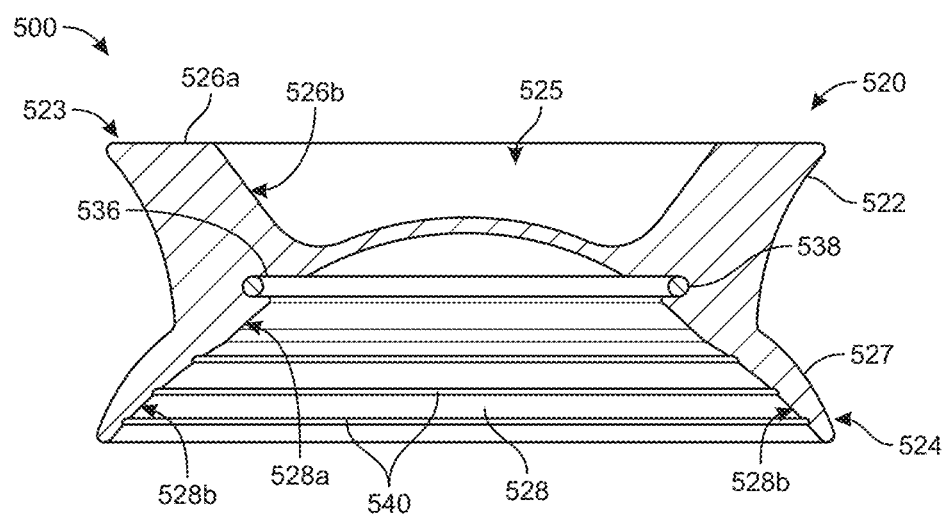

FIGS. 5A and 5B are bottom perspective and side cross-sectional views, respectively, of an electroretinography device 500 ("device 500"), configured in accordance with embodiments of the present technology. The device 500 comprises an ocular member 520 (e.g., the ocular member 120) including a proximal portion 524 (e.g., the proximal portion 124) and a distal portion 523 (e.g., the distal portion 123) coupled to the proximal portion 524. The device 500 can further include a conductive element 538 (e.g., the conductive element 138) disposed in an annular channel 536 (FIG. 5B) within the ocular member 520 and a signal relay (not shown) (e.g., the signal relay 130) operatively connected to the conductive element.

The proximal portion 524 comprises a proximal outer surface 527 extending radially inward along a distal direction (e.g., from the proximal portion 524 toward the distal portion 523) and a proximal inner surface (e.g., the proximal inner surface 128), including a cornea portion 528a (e.g., the cornea portion 128a), a sclera portion 528b (e.g., the sclera portion 128b), and an optional transition zone in between (collectively referred to as "proximal inner surface 528"), opposite the proximal outer surface 527. The distal portion 523 comprises a distal outer surface 522 (e.g., the distal outer surface 122) extending radially outward in the distal direction, a distal end surface 526a extending generally perpendicular to the distal direction, and a distal inner surface 526b opposite the distal outer surface 522 and defining at least in part a distal recess 525. The distal portion 523 can also include an aperture 531 extending from the distal outer surface 522 to the annular channel 536 to allow electrical connection between the conductive element 538 and the signal relay. In some embodiments, the aperture 531 is included elsewhere in the ocular member 520, such as through the proximal portion 524, or omitted.

The proximal inner surface 528 can include a recess feature 540. In the illustrated embodiment, the recess feature 540 comprises a plurality of circular and/or concentric grooves extending along the proximal inner surface 528. For example, the recess feature 540 can comprise a first concentric groove extending along the proximal inner surface 528, and a second concentric groove extending along the proximal inner surface 528 that is proximal to the first concentric groove. In some embodiments, the grooves are parallel to and concentric with the annular channel 536. In the illustrated embodiments, the grooves extend along the sclera portion 528b. The recess feature 540 can include any number of circular and/or concentric grooves, such as at least one, two, three, four, five, 10, 15, or between 1 and 15. In some embodiments, the circular grooves are oriented at one or more angles different from the illustrated embodiment (e.g., not parallel to the annular channel 536). The grooves can have identical, similar, or varying dimensions (e.g., depth into the proximal portion 524, width). Individual ones of the grooves can have a U-shaped, semi-circular, triangular, rectangular, or other cross-sectional profile that is constant or varies along the length of the groove. In some embodiments, the recess feature 540 comprises a series of adjacent grooves that form an undulating (e.g., sinusoidal) surface. Conversely, the proximal outer surface 527 is smooth and/or does not include a plurality of grooves.

During operation, when the ocular member 520 is disposed over an eye, the proximal inner surface 528 is disposed over an anterior surface of the eye. Unlike conventional electroretinography devices, in some embodiments, the proximal inner surface 528 covers a substantial portion of the exposed eye, which can lead to trapping any natural or artificial tears and other fluids between the ocular member 520 and the eye. Such fluids, if trapped therebetween, can cause discomfort to the subject, distort the light stimulus entering the eye, cause slippage between the device 500 and the eye, and/or affect the visual acuity of the subject, potentially leading to inaccurate measurements by the device 500. The grooves of the recess feature 540 can allow the fluids to pool within the grooves instead of pooling between the proximal inner surface 528 and the eye, providing for closer apposition of the device 500 and the eye. The grooves can be incorporated without undue manufacturing complexity, such as by including the grooves in the mold for the ocular member 520 or removing (e.g., cutting and/or carving) material from the ocular member 520 after molding.

Figure 6A:
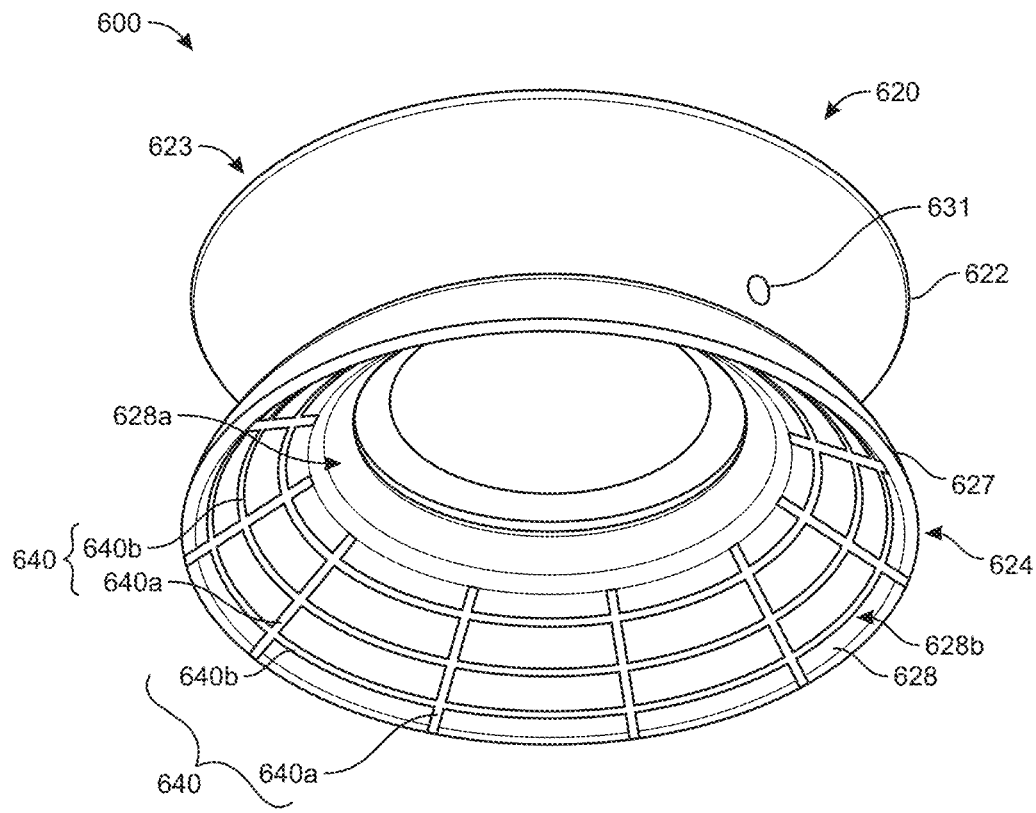
FIGS. 6A and 6B are bottom perspective and side cross-sectional views, respectively, of an electroretinography device, configured in accordance with embodiments of the present technology.
Figure 6B:
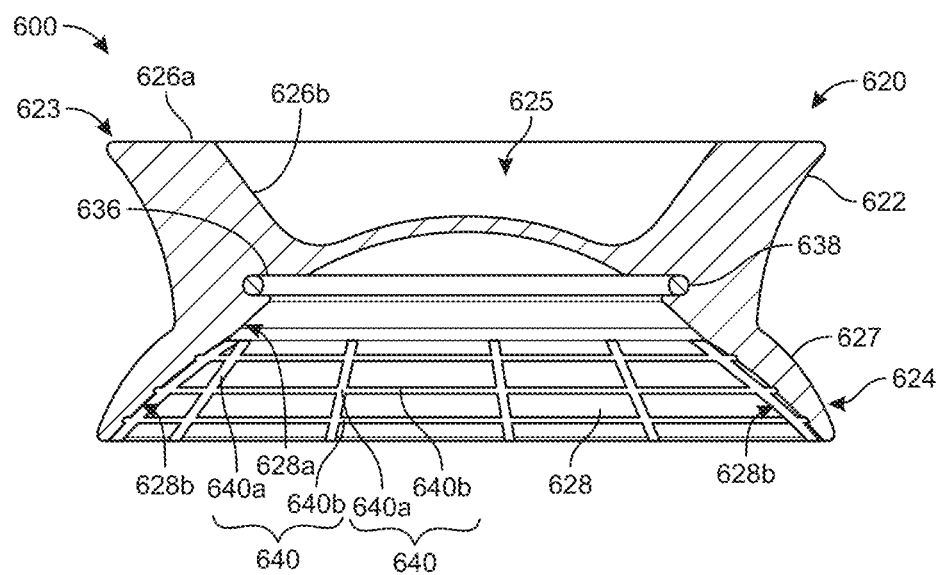

FIGS. 6A and 6B are bottom perspective and side cross-sectional views, respectively, of an electroretinography device 600 ("device 600"), configured in accordance with embodiments of the present technology. The device 600 comprises an ocular member 620 (e.g., the ocular member 120) including a proximal portion 624 (e.g., the proximal portion 124) and a distal portion 623 (e.g., the distal portion 123) coupled to the proximal portion 624. The device 600 can further include a conductive element 638 (e.g., the conductive element 138) disposed in an annular channel 636 (FIG. 6B) within the ocular member 620 and a signal relay (not shown) (e.g., the signal relay 130) operatively connected to the conductive element.

The proximal portion 624 comprises a proximal outer surface 627 extending radially inward along a distal direction (e.g., from the proximal portion 624 toward the distal portion 623) and a proximal inner surface (e.g., the proximal inner surface 128), including a cornea portion 628*a* (e.g., the cornea portion 128*a*), a sclera portion 628*b* (e.g., the sclera portion 128*b*), and an optional transition zone in between (collectively referred to as "proximal inner surface 628"), opposite the proximal outer surface 627. The distal portion 623 comprises a distal outer surface 622 (e.g., the distal outer surface 122) extending radially outward in the distal direction, a distal end surface 626*a* extending generally perpendicular to the distal direction, and a distal inner surface 626*b* opposite the distal outer surface 622 and defining at least in part a distal recess 625. The distal portion 623 can also include an aperture 631 extending from the distal outer surface 622 to the annular channel 636 to allow electrical connection between the conductive element and the signal relay. In some embodiments, the aperture 631 is included elsewhere in the ocular member 620, such as through the proximal portion 624, or be omitted.

The proximal inner surface 628 can include a groove with a plurality of first groove portions 640*a* (e.g., the recess feature 440 in FIGS. 4A-C) extending generally in a radial direction and a plurality of second groove portions 640*b* (e.g., the recess feature 540 in FIGS. 5A and 5B) (collectively referred to as "recess feature 640") extending around the proximal inner surface 628. In some embodiments, the recess feature 640 comprises two or more disjointed grooves. The recess feature 640 can include any number of linear and/or circular/concentric grooves, such as at least one, two, three, four, five, 10, 15, or between 1 and 15. In some embodiments, the first and/or second groove portions are oriented at one or more angles different from the illustrated embodiment. The grooves can have identical, similar, or varying dimensions (e.g., length, depth into the proximal portion 624, and/or width). Individual ones of the grooves can have a semi-circular, triangular, rectangular, or other cross-sectional profile that is constant or varies along the length of the groove. In some embodiments, the recess feature 640 comprises a series of adjacent grooves that form an undulating (e.g., sinusoidal) surface. Conversely, the proximal outer surface 627 is smooth and/or does not include a plurality of grooves.

During operation, when the ocular member 620 is disposed over an eye, the proximal inner surface 628 is disposed over an anterior surface of the eye. Unlike conventional electroretinography devices, in some embodiments, the proximal inner surface 628 covers a substantial portion of the exposed eye, which can lead to trapping any natural or artificial tears and other fluids between the ocular member 620 and the eye. Such fluids, if trapped therebetween, can cause discomfort to the subject, distort the light stimulus entering the eye, cause slippage between the device 600 and the eye, and/or affect the visual acuity of the subject, potentially leading to inaccurate measurements by the device 600. The recess feature 640 can allow the fluids to pool within the groove portions and/or travel away from between the ocular member 620 and the eye instead of pooling between the proximal inner surface 628 and the eye, providing a closer apposition between the device 600 and the eye. The groove portions can be incorporated without undue manufacturing complexity, such as by including the groove portions in the mold for the ocular member 620 or removing (e.g., cutting and/or carving) material from the ocular member 620 after molding.

Referring to FIGS. 4A-6B together, in some embodiments, the radius of individual ones of the grooves or channels forming the recess features 440, 540, 640 is between 0.01-5 mm or between 0.1-2 mm. The recess features 440, 540, 640 can transfer fluid via capillary action. The recess features 440, 540, 640 can have high aspect ratios for better microfluidics, as, e.g., narrower channels can achieve better capillary action. As one of ordinary skill in the art will appreciate, capillary pressure P can be calculated using Equation (1) below:

$$P = -\gamma \frac{\cos\theta_t + \cos\theta_b}{h} + \frac{\cos\theta_l + \cos\theta_r}{w} \quad (1)$$

In Equation (1) above, $\gamma$ is the surface tension of the liquid in the microchannel, h and w are the channel height and width, respectively, and $\theta_t$, $\theta_b$, $\theta_l$, $\theta_r$ are the top, bottom, left, and right contact angles of liquid with the corresponding four microchannel walls. As shown, the capillary pressure increases as the microchannel dimensions decrease, and the capillary pressure is roughly scaled proportionally to the inverse of the smallest dimension. In some embodiments, hydrophilic silanes (e.g., polyethylene glycol (PEG) silanes) are applied to the recess features 440, 540, 640 to reduce the contact angle of the substrate material (e.g., to between 30-60°) and thereby increase capillary pressure.

FIGS. 7A-D are top perspective, bottom perspective, bottom, and side cross-sectional views, respectively, of an electroretinography device 700 ("device 700"), configured in accordance with embodiments of the present technology. The device 700 comprises an ocular member 720 (e.g., the ocular member 120) including a proximal portion 724 (e.g., the proximal portion 124) and a distal portion 723 (e.g., the distal portion 123) coupled to the proximal portion 724. The device 700 can further include a conductive element 738 (e.g., the conductive element 138) disposed in an annular channel 736 (FIG. 7D) within the ocular member 720 and a signal relay (not shown) (e.g., the signal relay 130) operatively connected to the conductive element.

The proximal portion 724 comprises a proximal outer surface 727 extending radially inward along a distal direction (e.g., from the proximal portion 724 toward the distal portion 723) and a proximal inner surface (e.g., the proximal inner surface 128), including a cornea portion 728*a* (e.g., the cornea portion 128*a*), a sclera portion 728*b* (e.g., the sclera portion 128*b*), and an optional transition zone in between (collectively referred to as "proximal inner surface 728"), opposite the proximal outer surface 727. The distal portion 723 comprises a distal outer surface 722 (e.g., the distal outer surface 122) extending radially outward in the distal direction, a distal end surface 726*a* extending generally perpendicular to the distal direction, and a distal inner surface 726*b* opposite the distal outer surface 722 and defining at least in part a distal recess 725.

The proximal inner surface 728 can include a recess feature 740. In the illustrated embodiment, the recess feature 740 comprises a plurality of channels extending through the proximal portion 724 from the proximal outer surface 727 to the proximal inner surface 728 (e.g., the sclera portion 728*b*). In some embodiments, individual ones of the channels are spaced apart from an axis extending through a center of the ocular member 720 by at least 4 millimeters (mm), 6 mm, 8 mm, or 4-8 mm. In some embodiments, individual ones of the channels are arranged around the proximal portion 724 in a predetermined pattern. The recess feature 740 can include any number of channels, such as at least one, two, three, four, five, 10, 15, or between 1 and 15. In the illustrated embodiment, the channels extend in the distal direction, as shown in FIG. 7D. In some embodiments, the channels are oriented at one or more angles different from the illustrated embodiment (e.g., at least 10 degrees, 20 degrees, 30 degrees, 40 degrees, 50 degrees, 60 degrees, 70 degrees, 80 degrees, 90 degrees, or 10-90 degrees from the distal direction). The channels can have identical, similar, or varying cross-sectional profiles. Individual ones of the channels can have a circular, semi-circular, triangular, rectangular, or other cross-sectional profile that is constant or varies along the length of the channel.

During operation, when the ocular member 720 is disposed over an eye, the proximal inner surface 728 is disposed over an anterior surface of the eye. Unlike conventional electroretinography devices, in some embodiments, the proximal inner surface 728 covers a substantial portion of the exposed eye, which can lead to trapping any natural or artificial tears and other fluids between the ocular member 720 and the eye. Such fluids, if trapped therebetween, can cause discomfort to the subject, distort the light stimulus entering the eye, cause slippage between the device 700 and the eye, and/or affect the visual acuity of the subject, potentially leading to inaccurate measurements by the device 700. The channels of the recess feature 740 can allow the fluids to travel away from between the proximal inner surface 728 and the eye. The channels can be incorporated without undue manufacturing complexity, such as by including the channel features in the mold for the ocular member 720 or removing (e.g., cutting and/or carving) material from the ocular member 720 after molding.

Figure 8:
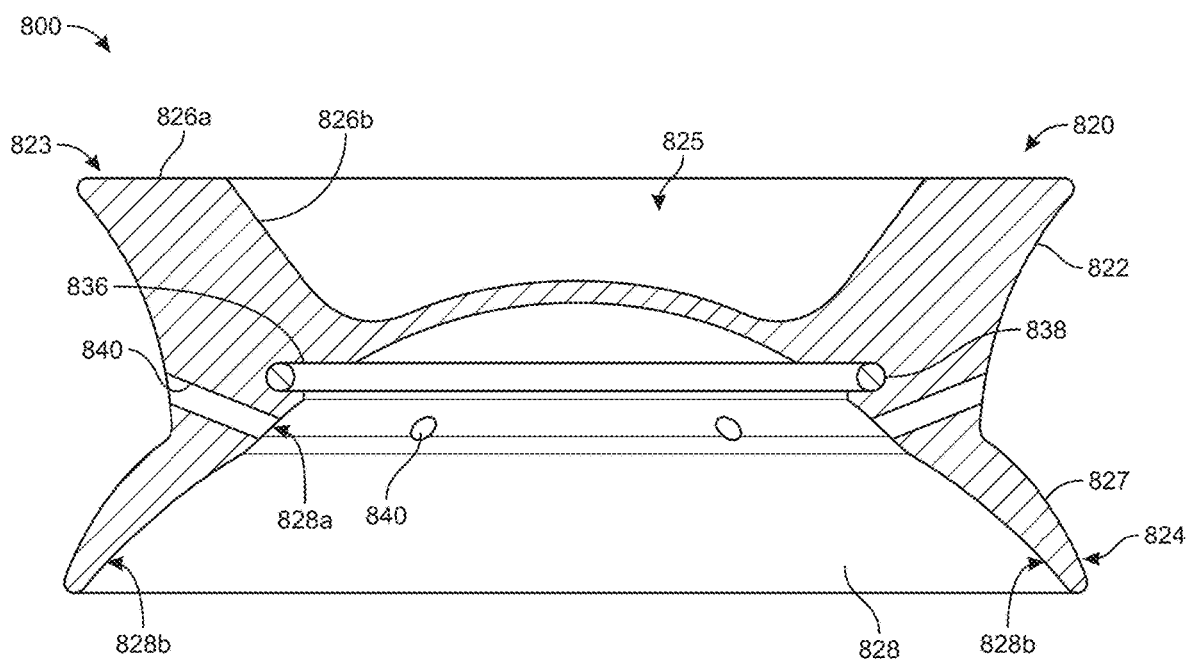
FIG. 8 is a side cross-sectional view of an electroretinography device, configured in accordance with embodiments of the present technology.

FIG. 8 is a side cross-sectional view of an electroretinography device 800 ("device 800"), configured in accordance with embodiments of the present technology. The device 800 comprises an ocular member 820 (e.g., the ocular member 120) including a proximal portion 824 (e.g., the proximal portion 124) and a distal portion 823 (e.g., the distal portion 123) coupled to the proximal portion 824. The device 800 can further include a conductive element 838 (e.g., the conductive element 138) disposed in an annular channel 836 within the ocular member 820 and a signal relay (not shown) (e.g., the signal relay 130) operatively connected to the conductive element.

The proximal portion 824 comprises a proximal outer surface 827 extending radially inward along a distal direction (e.g., from the proximal portion 824 toward the distal portion 823) and a proximal inner surface (e.g., the proximal inner surface 128), including a cornea portion 828a (e.g., the cornea portion 128a), a sclera portion 828b (e.g., the sclera portion 128b), and an optional transition zone in between (collectively referred to as "proximal inner surface 828"), opposite the proximal outer surface 827. As shown in the illustrated embodiment, the annular channel 836 extends around the cornea portion 128a. The distal portion 823 comprises a distal outer surface 822 (e.g., the distal outer surface 122) extending radially outward in the distal direction, a distal end surface 826a extending generally perpendicular to the distal direction, and a distal inner surface 826b opposite the distal outer surface 822 and defining at least in part a distal recess 825.

The proximal inner surface 828 can include a recess feature 840. In the illustrated embodiment, the recess feature 840 comprises a plurality of channels extending through the proximal portion 824 and the distal portion 823 from the distal outer surface 822 to the proximal inner surface 828. Individual ones of the channels can extend from the proximal outer surface 827. Individual ones of the channels can extend to the cornea portion 828a (as shown) or the sclera portion 828b. In some embodiments, individual ones of the channels are spaced apart from an axis extending through a center of the ocular member 820 by at least 4 millimeters (mm), 6 mm, 8 mm, or 4-8 mm. In some embodiments, individual ones of the channels are arranged around the proximal portion 824 in a predetermined pattern. The recess feature 840 can include any number of channels, such as at least one, two, three, four, five, 10, 15, or between 1 and 15. In the illustrated embodiment, the channels extend at an angle relative to the distal direction. In some embodiments, the channels are oriented at one or more angles different from the illustrated. The channels can have identical, similar, or varying cross-sectional dimensions. Individual ones of the channels can have a circular, semi-circular, triangular, rectangular, or other cross-sectional profile that is constant or varies along the length of the channel.

During operation, when the ocular member 820 is disposed over an eye, the proximal inner surface 828 is disposed over an anterior surface of the eye. Unlike conventional electroretinography devices, in some embodiments, the proximal inner surface 828 covers a substantial portion of the exposed eye, which can lead to trapping any natural or artificial tears and other fluids between the ocular member 820 and the eye. Such fluids, if trapped therebetween, can cause discomfort to the subject, distort the light stimulus entering the eye, cause slippage between the device 800 and the eye, and/or affect the visual acuity of the subject, potentially leading to inaccurate measurements by the device 800. The channels of the recess feature 840 can allow the fluids to travel away from between the proximal inner surface 828 and the eye. The channels can be incorporated without undue manufacturing complexity, such as by including the channel features in the mold for the ocular member 820 or removing (e.g., cutting and/or carving) material from the ocular member 820 after molding.

Figure 7A:
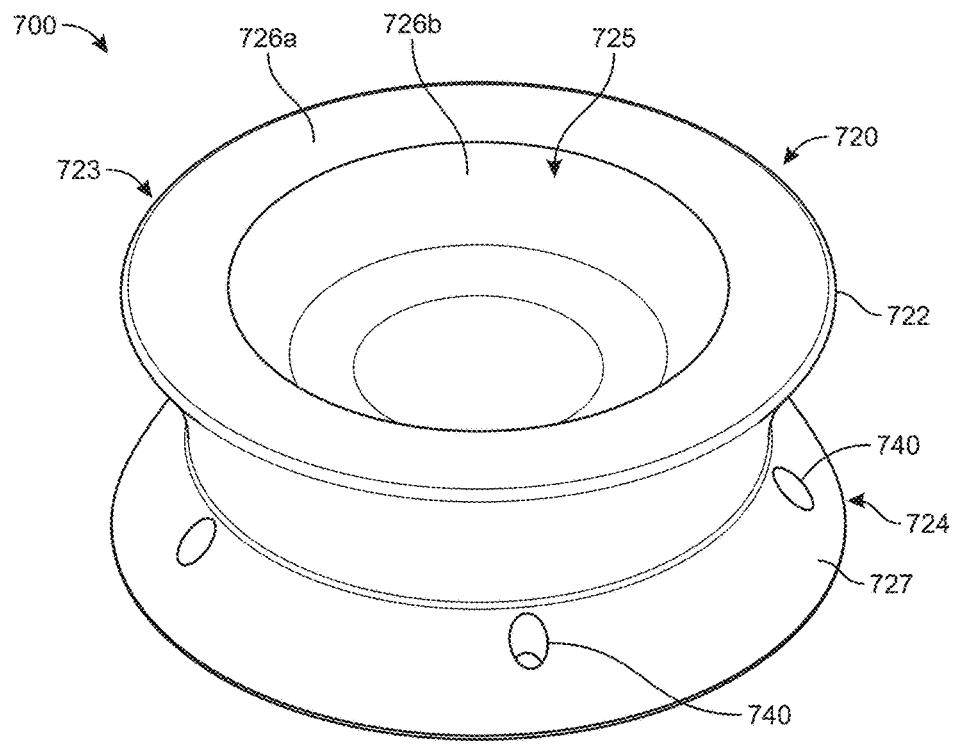
FIGS. 7A-D are top perspective, bottom perspective, bottom, and side cross-sectional views, respectively, of an electroretinography device, configured in accordance with embodiments of the present technology.
Figure 7B:
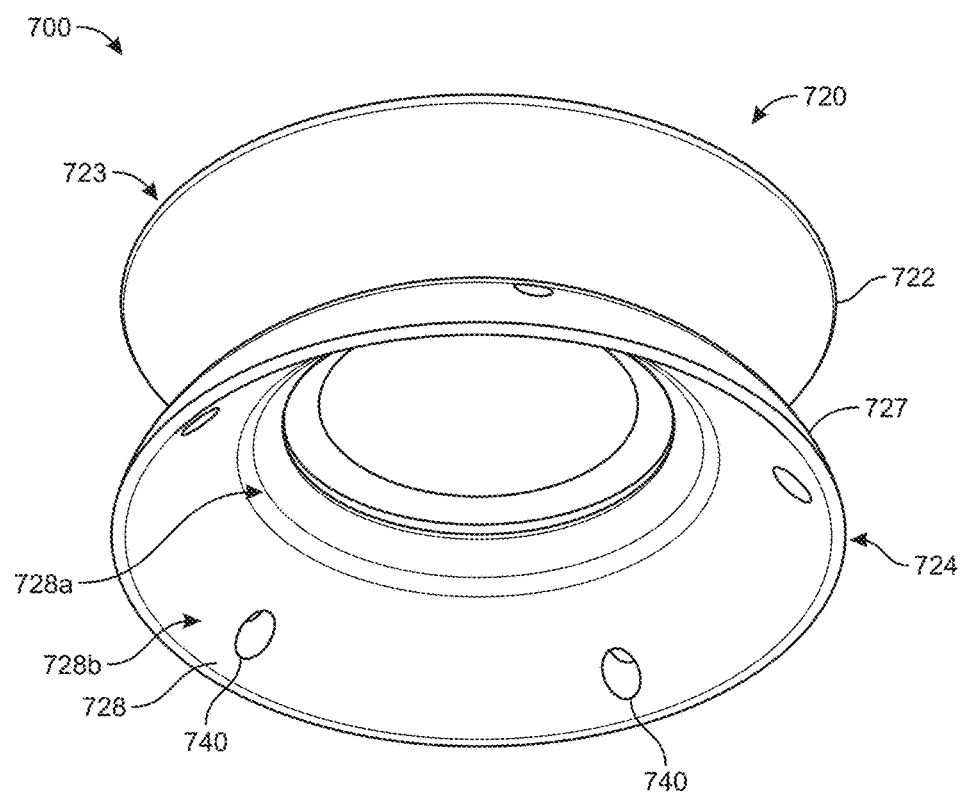
Figure 7C:
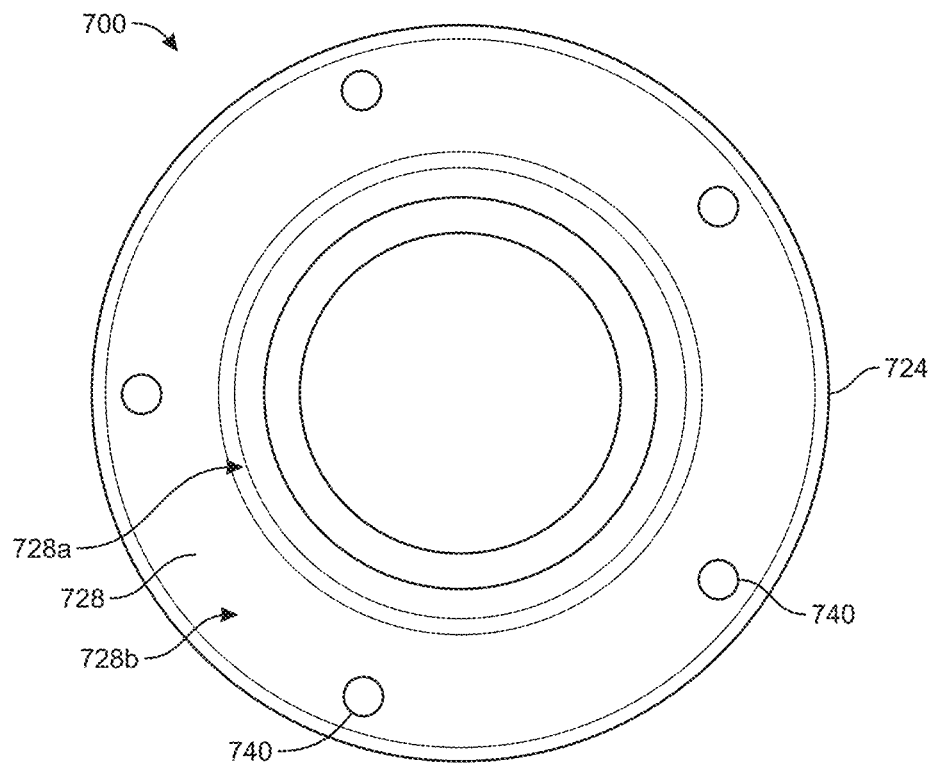
Figure 7D:
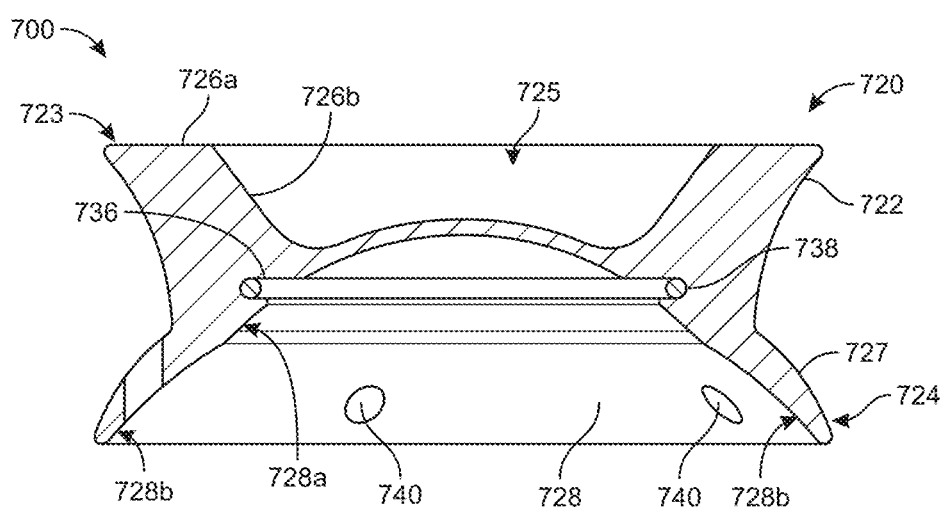

Referring to FIGS. 7A-8 together, in some embodiments, the diameter or other cross-sectional dimension of individual ones of the channels forming the recess features 740, 840 is between 0.01-5 mm or between 0.1-2 mm. The recess features 740, 840 can transfer fluid via capillary action. As discussed above with reference to FIGS. 4A-6B, narrower channels can achieve better capillary action. Thus, the channels forming the recess features 740, 840 can have high aspect ratios for improved microfluidics.

Figure 9A:
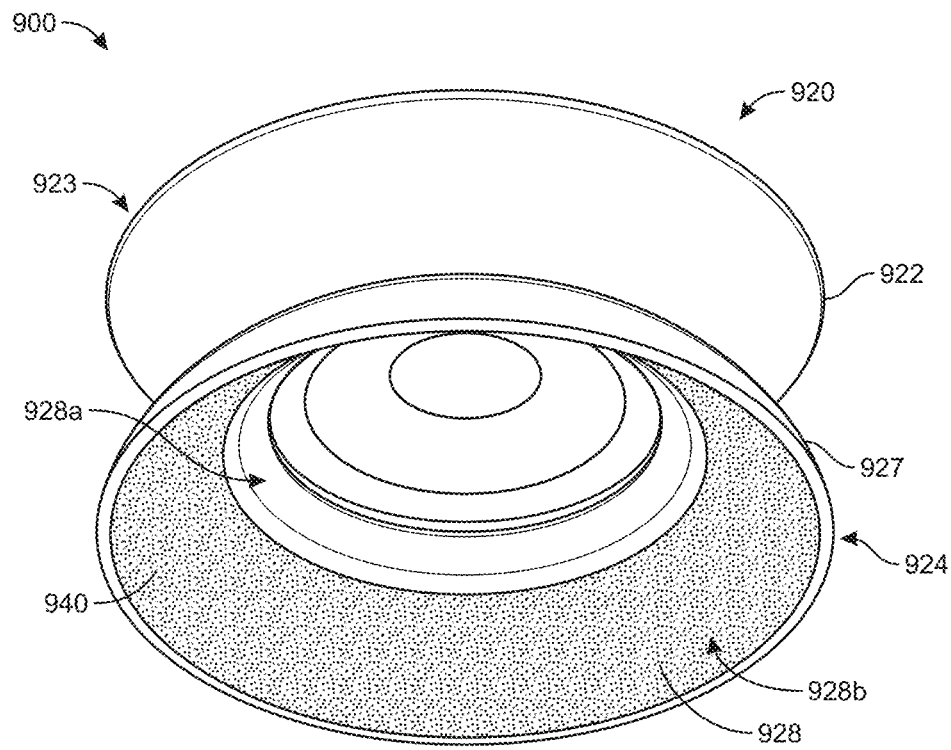
FIGS. 9A and 9B are bottom perspective and side cross-sectional views, respectively, of an electroretinography device, configured in accordance with embodiments of the present technology.
Figure 9B:
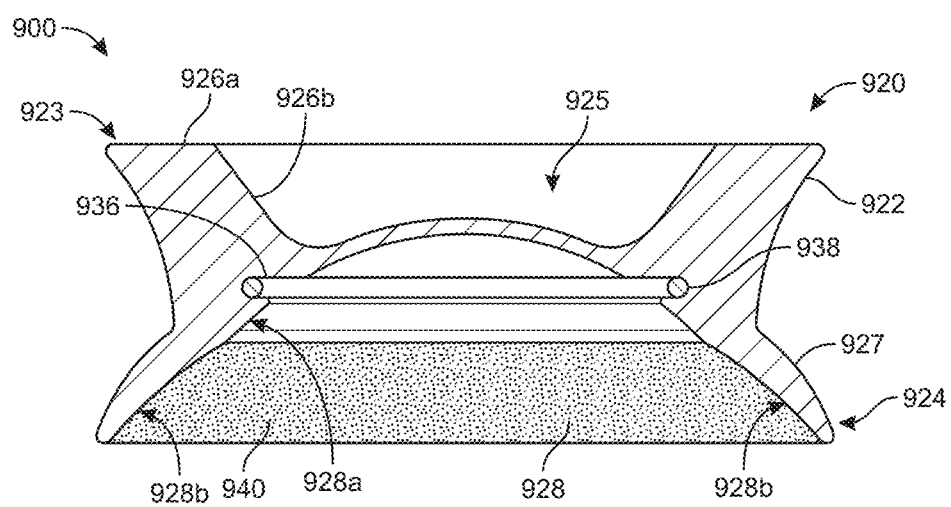

FIGS. 9A and 9B are bottom perspective and side cross-sectional views, respectively, of an electroretinography device 900 ("device 900"), configured in accordance with embodiments of the present technology. The device 900 comprises an ocular member 920 (e.g., the ocular member 120) including a proximal portion 924 (e.g., the proximal portion 124) and a distal portion 923 (e.g., the distal portion 123) coupled to the proximal portion 924. The device 900 can further include a conductive element 938 (e.g., the conductive element 138) disposed in an annular channel 936 (FIG. 9B) within the ocular member 920 and a signal relay (not shown) (e.g., the signal relay 130) operatively connected to the conductive element.

The proximal portion 924 comprises a proximal outer surface 927 extending radially inward along a distal direction (e.g., from the proximal portion 924 toward the distal portion 923) and a proximal inner surface (e.g., the proximal inner surface 128), including a cornea portion 928a (e.g., the cornea portion 128a), a sclera portion 928b (e.g., the sclera portion 128b), and an optional transition zone in between (collectively referred to as "proximal inner surface 928"), opposite the proximal outer surface 927. The distal portion 923 comprises a distal outer surface 922 (e.g., the distal outer surface 122) extending radially outward in the distal direction, a distal end surface 926a extending generally perpendicular to the distal direction, and a distal inner surface 926b opposite the distal outer surface 922 and defining at least in part a distal recess 925. The distal portion 923 can also include an aperture (not shown) extending from the distal outer surface 922 to the annular channel 936 to allow electrical connection between the conductive element and the signal relay. In some embodiments, the aperture is included elsewhere in the ocular member 920, such as through the proximal portion 924, or be omitted.

At least a portion of the proximal inner surface 928 can be roughened or non-smooth, as illustrated by texture 940. In the illustrated embodiment, the texture 940 is formed on, covers, or otherwise extends across the sclera portion 928b. In some embodiments, the texture 940 is formed only on a portion of the sclera portion 928b. The texture 940 can be molded onto the sclera portion 928b of the proximal inner surface 928, created through chemical or physical means (e.g., etching) after the ocular member 920 is molded and cured, or added to the surface of the cured ocular member 920 (e.g., spattering silicone or other material in a random pattern on the relevant surface). Conversely, in some embodiments, the cornea portion 928a comprises a smooth texture.

During operation, when the ocular member 920 is disposed over an eye, the proximal inner surface 928 is disposed over an anterior surface of the eye. Unlike conventional electroretinography devices, in some embodiments, the proximal inner surface 928 covers a substantial portion of the exposed eye, which can lead to trapping any natural or artificial tears and other fluids between the ocular member 920 and the eye. Such fluids, if trapped therebetween, can cause discomfort to the subject, distort the light stimulus entering the eye, cause slippage between the device 900 and the eye, and/or affect the visual acuity of the subject, potentially leading to inaccurate measurements by the device 900. The texture 940 can allow the fluids to pool between features of the texture 940 and/or travel away from between the ocular member 920 and the eye instead of pooling between the proximal inner surface 928 and the eye, providing a closer apposition between the device 900 and the eye.

Figure 10A:
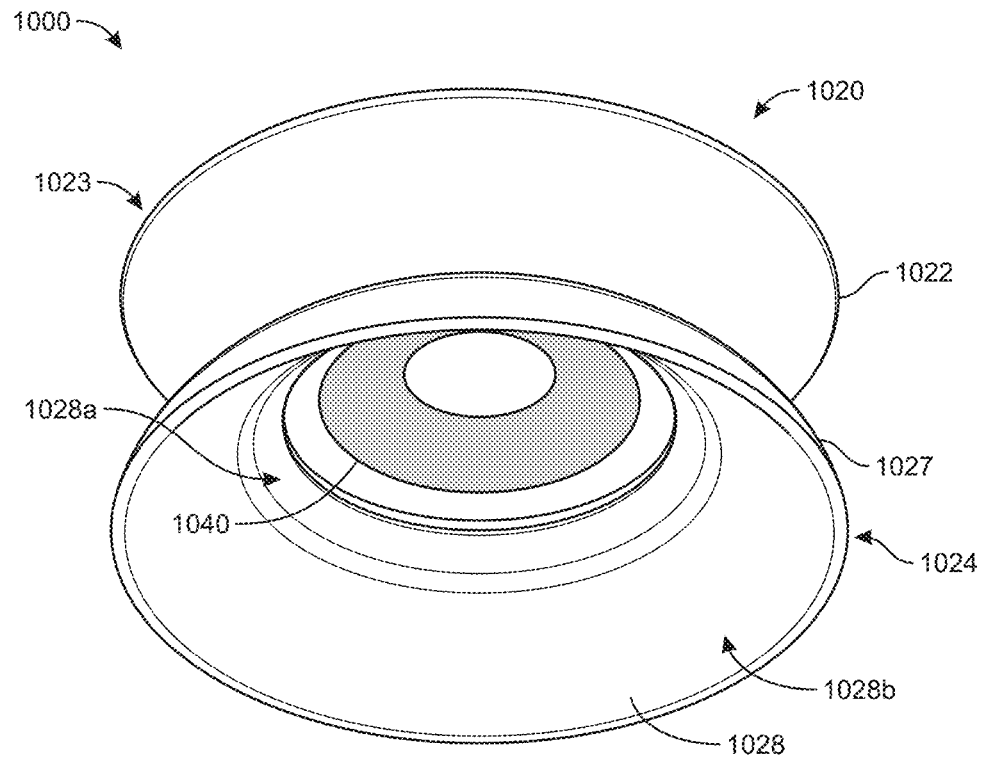
FIGS. 10A and 10B are bottom perspective and side cross-sectional views, respectively, of an electroretinography device, configured in accordance with embodiments of the present technology.
Figure 10B:
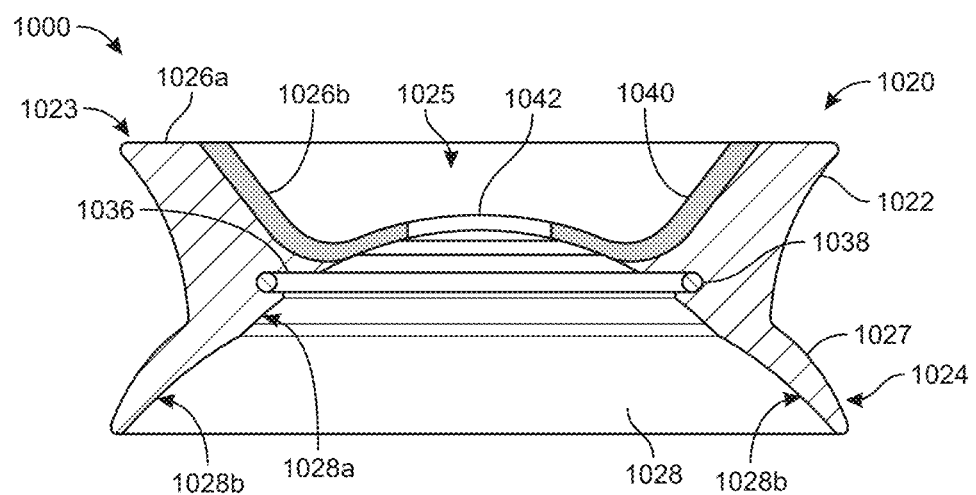

IV. Electroretinography Systems and Devices for Improving the Quality of the Light Stimulus Delivered to the Eye FIGS. 10A and 10B are bottom perspective and side cross-sectional views, respectively, of an electroretinography device 1000 ("device 1000"), configured in accordance with embodiments of the present technology. The device 1000 comprises an ocular member 1020 (e.g., the ocular member 120) including a proximal portion 1024 (e.g., the proximal portion 124), a distal portion 1023 (e.g., the distal portion 123) coupled to the proximal portion 1024, and a film 1042 coupled to the proximal and distal portions 1024, 1023. The device 1000 can further include a conductive element 1038 (e.g., the conductive element 138) disposed in an annular channel 1036 within the ocular member 1020 and a signal relay (not shown) (e.g., the signal relay 130) operatively connected to the conductive element.

The proximal portion 1024 comprises a proximal outer surface 1027 extending radially inward along a distal direction (e.g., from the proximal portion 1024 toward the distal portion 1023) and a proximal inner surface (e.g., the proximal inner surface 128), including a cornea portion 1028a (e.g., the cornea portion 128a), and a sclera portion 1028b (e.g., the sclera portion 128b), and an optional transition zone in between (collectively referred to as "proximal inner surface 1028"), opposite the proximal outer surface 1027. The distal portion 1023 comprises a distal outer surface 1022 (e.g., the distal outer surface 122) extending radially outward in the distal direction, a distal end surface 1026a extending generally perpendicular to the distal direction, and a distal inner surface 1026b opposite the distal outer surface 1022 and defining at least in part a distal recess 1025.

The film 1042 can be positioned at the distal recess 1025 and can have a concave shape configured to conform to at least a portion of the eye's cornea. In the illustrated embodiment, the film 1042 has a central portion (e.g., the non-shaded portion of the film 1042 in FIG. 10B) with a first transparency and a peripheral portion (e.g., the shaded portion of the film 1042 surrounding the central portion) with a second transparency. In some embodiments, the second transparency is less transparent than the first transparency, such that the peripheral portion is darker than the central portion of the film 1042. For example, the part with the first transparency can be transparent or translucent, and/or comprise a transparent or translucent material, while the part with the second transparency can be opaque and/or comprise an opaque material. As shown in FIG. 10B, the part of the ocular member 1020 with the second transparency can extend beyond the film 1042 such that at least some of the distal portion (e.g., a layer 1040 along the distal inner surface 1026b) is opaque and/or comprises an opaque material.

During operation, when the ocular member 1020 is disposed over an eye, the proximal inner surface 1028 is disposed over an anterior surface of the eye. The opaque parts of the ocular member 1020 can block at least some of the light stimulus from reaching the subject's eye such that only the portion of the light stimulus passing through the transparent part (e.g., the central portion of the film 1042) reaches the eye, effectively creating an artificial pupil with a constant size (e.g., diameter). Having an artificial pupil with a constant size can beneficially maintain the amount of light stimulus applied to the eye constant across different subjects and/or across multiple electroretinography tests of the same subject. Unlike conventional related devices that do not have the artificial pupil or differences in transparency, and since natural pupil size can vary between subjects and throughout the day for an individual subject, embodiments of the present technology enable electrophysiological measurements to be made that are more consistent and therefore more easily comparable.

Figure 11A:
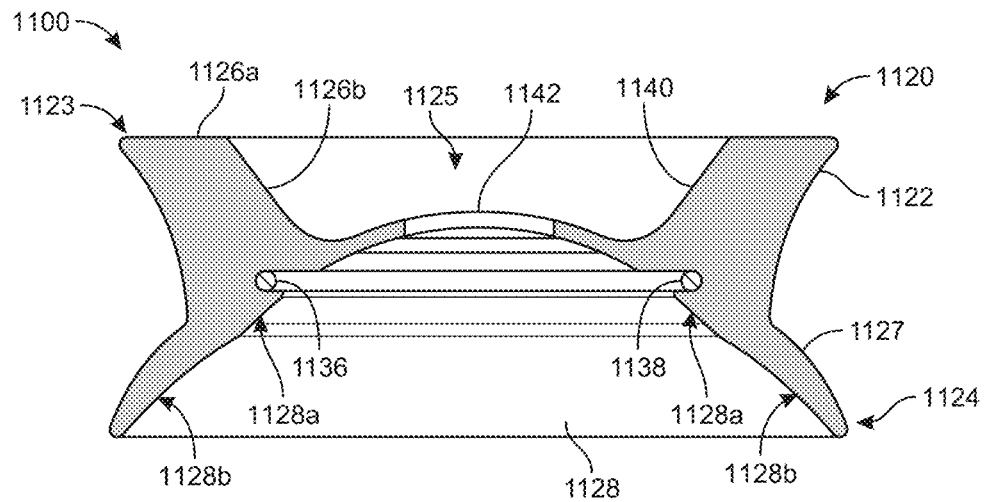
FIGS. 11A, 11B, and 11C are side cross-sectional, top perspective, and bottom perspective views, respectively, of an electroretinography device, configured in accordance with embodiments of the present technology.
Figure 11B:
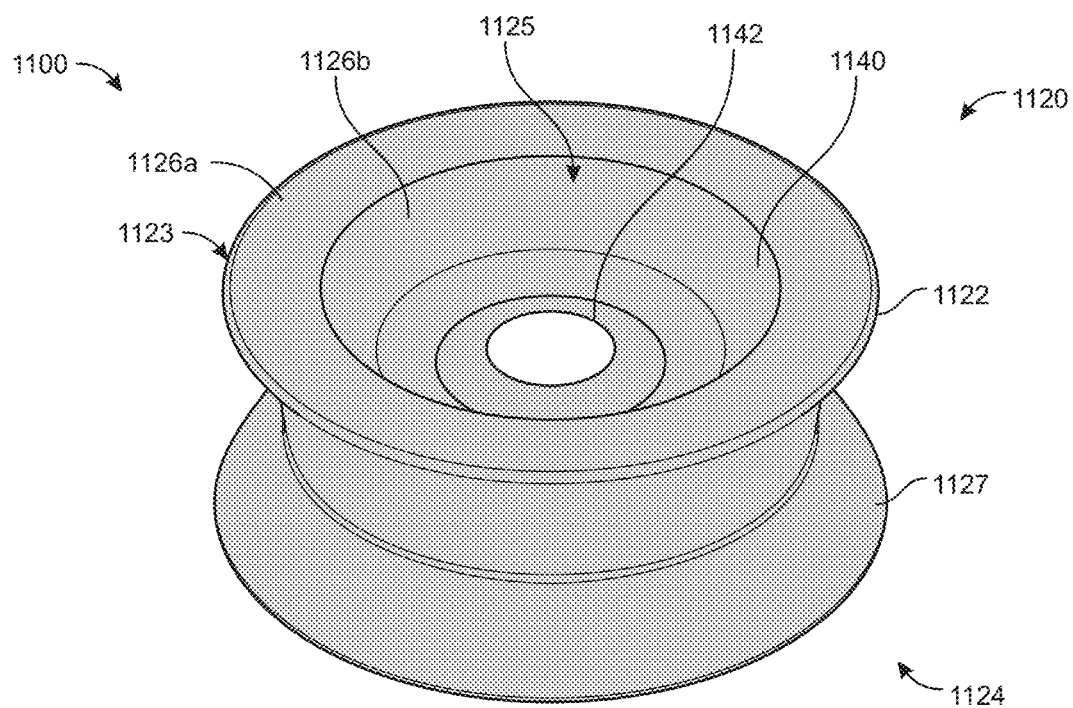
Figure 11C:
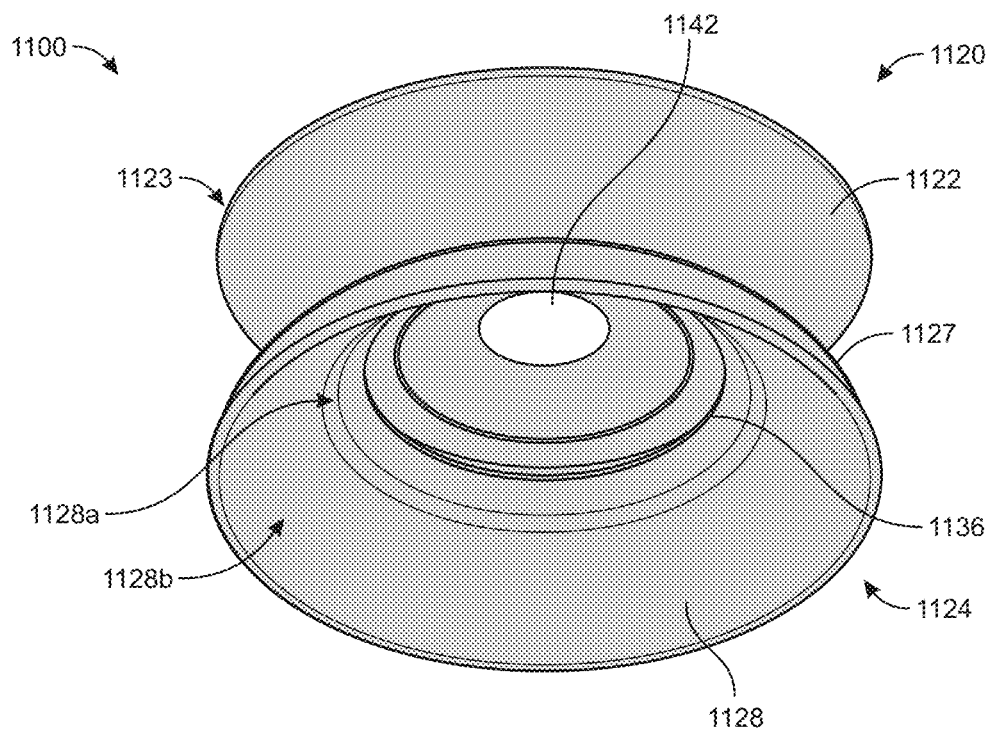

FIGS. 11A, 11B, and 11C are side cross-sectional, top perspective, and bottom perspective views, respectively, of an electroretinography device 1100 ("device 1100"), configured in accordance with embodiments of the present technology. Referring to FIGS. 11A-11C together, the device 1100 comprises an ocular member 1120 (e.g., the ocular member 120) including a proximal portion 1124 (e.g., the proximal portion 124), a distal portion 1123 (e.g., the distal portion 123) coupled to the proximal portion 1124, and a film 1142 coupled to the proximal and distal portions 1124, 1123. The device 1100 can further include a conductive element 1138 (e.g., the conductive element 138) disposed in an annular channel 1136 within the ocular member 1120 and a signal relay (not shown) (e.g., the signal relay 130) operatively connected to the conductive element.

The proximal portion 1124 comprises a proximal outer surface 1127 extending radially inward along a distal direction (e.g., from the proximal portion 1124 toward the distal portion 1123) and a proximal inner surface (e.g., the proximal inner surface 128), including a cornea portion 1128a (e.g., the cornea portion 128a), a sclera portion 1128b (e.g., the sclera portion 128b), and an optional transition zone in between (collectively referred to as "proximal inner surface 1128"), opposite the proximal outer surface 1127. The distal portion 1123 comprises a distal outer surface 1122 (e.g., the distal outer surface 122) extending radially outward in the distal direction, a distal end surface 1126a extending generally perpendicular to the distal direction, and a distal inner surface 1126b opposite the distal outer surface 1122 and defining at least in part a distal recess 1125.

The film 1142 can be positioned at the distal recess 1125 and can have a concave shape configured to conform to at least a portion of the eye's cornea. In the illustrated embodiment, the film 1142 has a central portion (e.g., the non-shaded portion of the film 1142) with a first transparency and a peripheral portion (e.g., the shaded portion of the film 1142 surrounding the central portion) with a second transparency. In some embodiments, the second transparency is less transparent than the first transparency. For example, the part with the first transparency can be transparent or translucent, and/or comprise a transparent or translucent material, while the part with the second transparency can be opaque and/or comprise an opaque material. As shown, the part of the ocular member 1120 with the second transparency can extend beyond the film 1142 such that an entirety of the ocular member 1120 excluding the central portion of the film 1142 (shown by the patterned portion 1140) is opaque and/or comprises an opaque material.

During operation, when the ocular member 1120 is disposed over an eye, the proximal inner surface 1128 is disposed over an anterior surface of the eye. The opaque parts of the ocular member 1120 can block some of the light stimulus from reaching the subject's eye such that only the portion of the light stimulus passing through the transparent part (e.g., the central portion of the film 1142) reaches the eye, effectively creating an artificial pupil with a constant size (e.g., diameter). Having an artificial pupil with a constant size can be beneficial by maintaining the amount of light stimulus applied to the eye constant across different subjects and/or across multiple electroretinography tests of the same subject, since natural pupil size can vary between subjects, and from day to day and throughout the day for a given subject.

Figure 12A:
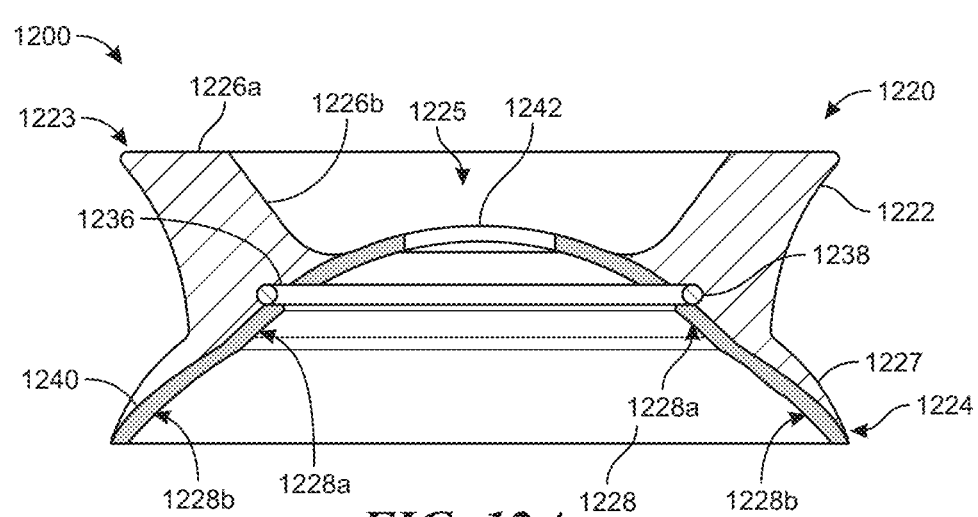
FIGS. 12A, 12B, and 12C are side cross-sectional, top perspective, and bottom perspective views, respectively of an electroretinography device, configured in accordance with embodiments of the present technology.
Figure 12B:
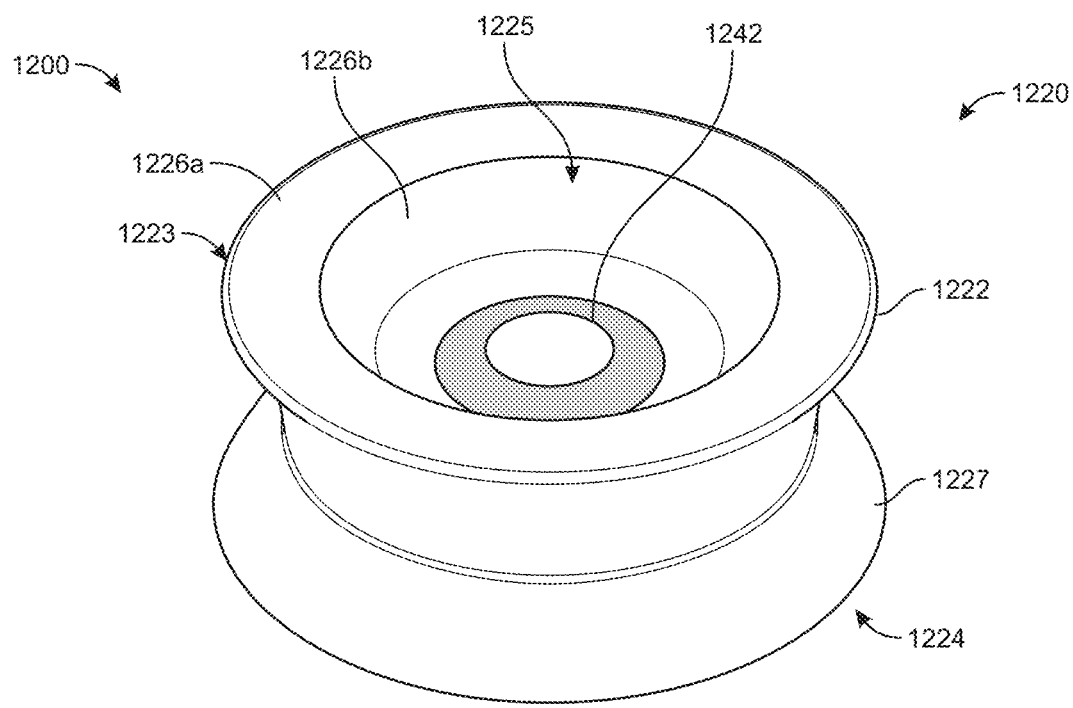
Figure 12C:
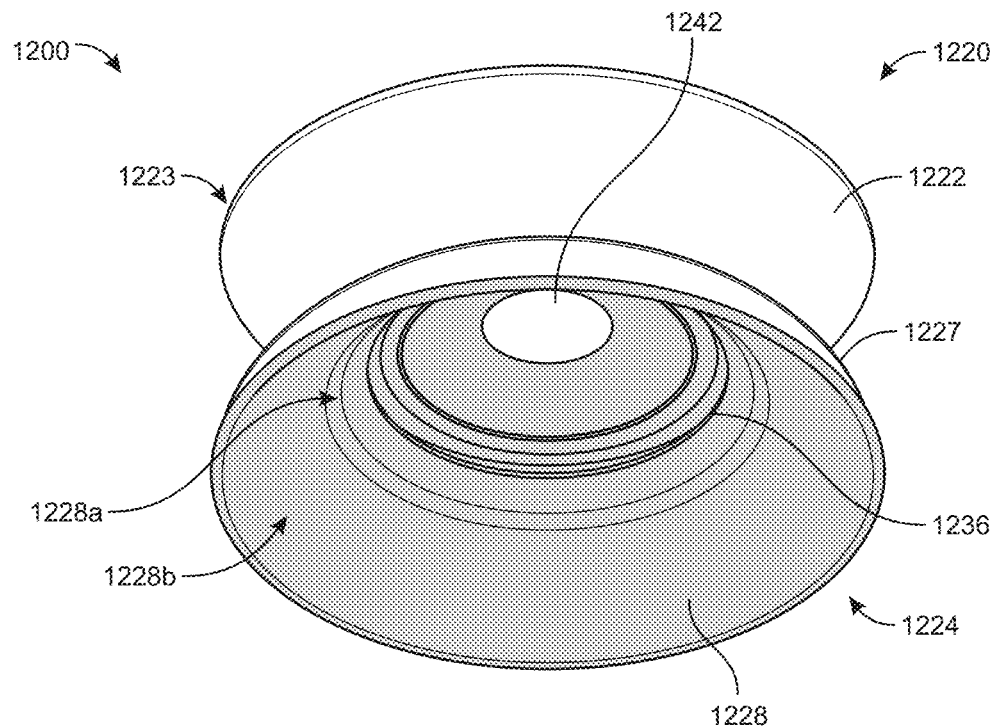

FIGS. 12A, 12B, and 12C are side cross-sectional, top perspective, and bottom perspective views, respectively, of an electroretinography device 1200 ("device 1200"), configured in accordance with embodiments of the present technology. Referring to FIGS. 12A-12C together, the device 1200 comprises an ocular member 1220 (e.g., the ocular member 120) including a proximal portion 1224 (e.g., the proximal portion 124), a distal portion 1223 (e.g., the distal portion 123) coupled to the proximal portion 1224, and a film 1242 disposed between the proximal and distal portions 1224, 1223. The device 1200 can further include a conductive element 1238 (e.g., the conductive element 138) disposed in an annular channel 1236 within the ocular member 1220 and a signal relay (not shown) (e.g., the signal relay 130) operatively connected to the conductive element.

The proximal portion 1224 comprises a proximal outer surface 1227 extending radially inward along a distal direction (e.g., from the proximal portion 1224 toward the distal portion 1223) and a proximal inner surface (e.g., the proximal inner surface 128), including a cornea portion 1228a (e.g., the cornea portion 128a), a sclera portion 1228b (e.g., the sclera portion 128b), and an optional transition zone in between (collectively referred to as "proximal inner surface 1228"), opposite the proximal outer surface 1227. The distal portion 1223 comprises a distal outer surface 1222 (e.g., the distal outer surface 122) extending radially outward in the distal direction, a distal end surface 1226a extending generally perpendicular to the distal direction, and a distal inner surface 1226b opposite the distal outer surface 1222 and defining at least in part a distal recess 1225.

The film 1242 can be positioned at the distal recess 1225 and can have a concave shape configured to conform to at least a portion of the eye's cornea. In the illustrated embodiment, the film 1242 has a central portion (e.g., the non-shaded portion of the film 1242 in FIGS. 12A-12C) with a first transparency and a peripheral portion (e.g., the shaded portion of the film 1242 surrounding the central portion) with a second transparency. In some embodiments, the second transparency is less transparent than the first transparency. For example, the part with the first transparency can be transparent or translucent, and/or comprise a transparent or translucent material, while the part with the second transparency can be opaque and/or comprise an opaque material. As shown in FIGS. 12A and 12C, the part of the ocular member 1220 with the second transparency can extend beyond the film 1242 such that some or an entirety of the proximal portion 1224 (shown by the patterned portion 1240) is opaque and/or comprises an opaque material.

During operation, when the ocular member 1220 is disposed over an eye, the proximal inner surface 1228 is disposed over an anterior surface of the eye. The opaque parts of the ocular member 1220 can block some of the light stimulus from reaching the subject's eye such that only the portion of the light stimulus passing through the transparent part (e.g., the central portion of the film 1242) reaches the eye, effectively creating an artificial pupil with a constant size (e.g., diameter). Having an artificial pupil with a constant size can be beneficial by maintaining the amount of light stimulus applied to the eye constant across different subjects and/or across multiple electroretinography tests of the same subject, since natural pupil size can vary throughout the day.

Figure 13A:
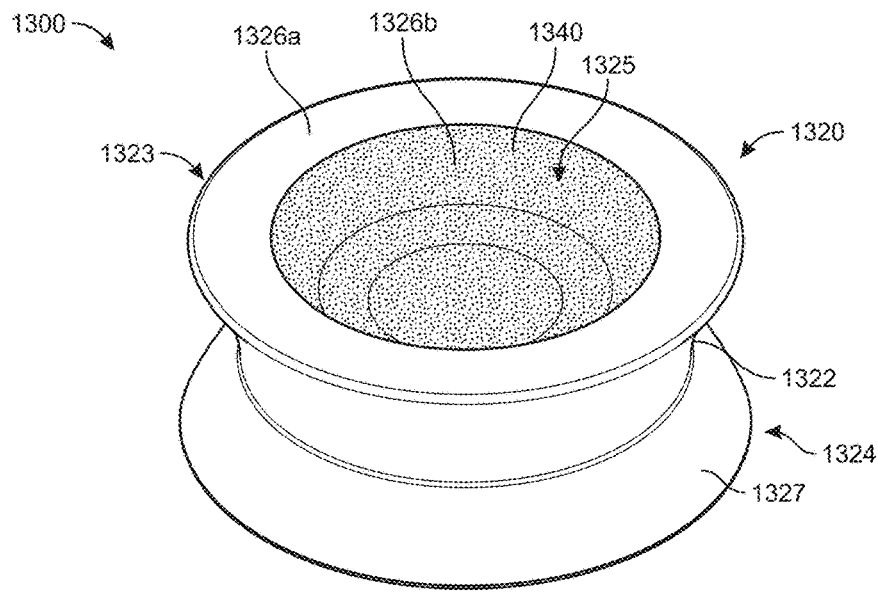
FIGS. 13A-C are top perspective, top, and side cross-sectional views, respectively, of an electroretinography device, configured in accordance with embodiments of the present technology.
Figure 13B:
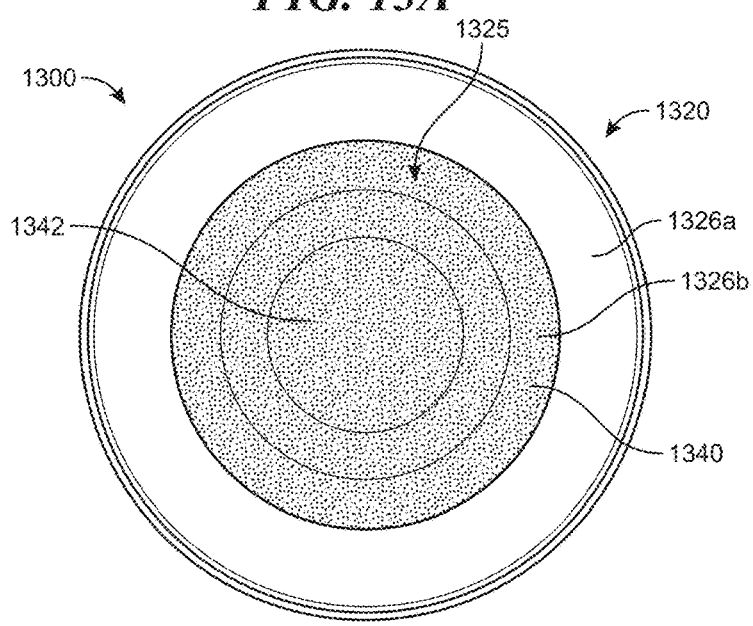
Figure 13C:
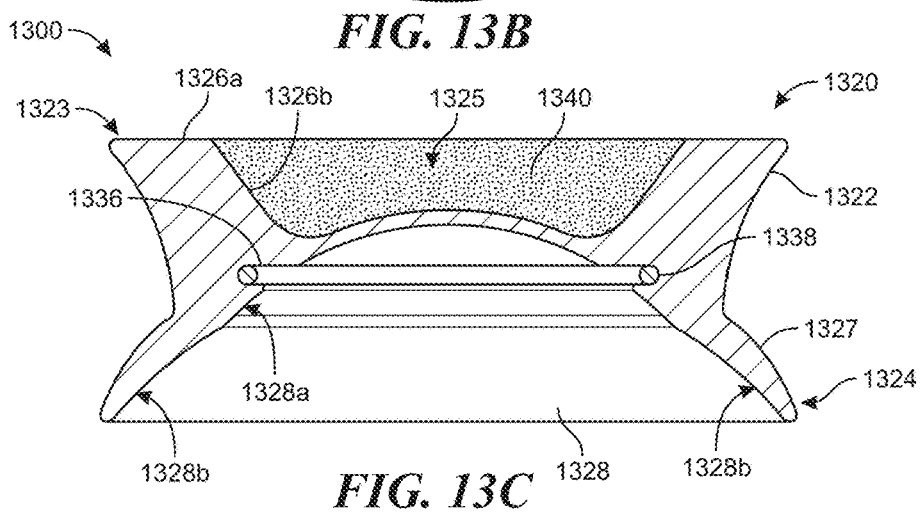

FIGS. 13A-C are top perspective, top, and side cross-sectional views, respectively, of an electroretinography device 1300 ("device 1300"), configured in accordance with embodiments of the present technology. The device 1300 comprises an ocular member 1320 (e.g., the ocular member 120) including a proximal portion 1324 (e.g., the proximal portion 124), a distal portion 1323 (e.g., the distal portion 123) coupled to the proximal portion 1324, and a film 1342 coupled to the proximal and distal portions 1324, 1323. The device 1300 can further include a conductive element 1338 (e.g., the conductive element 138) disposed in an annular channel 1336 (FIG. 13C) within the ocular member 1320 and a signal relay (not shown) (e.g., the signal relay 130) operatively connected to the conductive element.

The proximal portion 1324 comprises a proximal outer surface 1327 extending radially inward along a distal direction (e.g., from the proximal portion 1324 toward the distal portion 1323) and a proximal inner surface (e.g., the proximal inner surface 128), including a cornea portion 1328a

(e.g., the cornea portion 128a), a sclera portion 1328b (e.g., the sclera portion 128b), and an optional transition zone in between (collectively referred to as "proximal inner surface 1328"), opposite the proximal outer surface 1327. The distal portion 1323 comprises a distal outer surface 1322 (e.g., the distal outer surface 122) extending radially outward in the distal direction, a distal end surface 1326a extending generally perpendicular to the distal direction, and a distal inner surface 1326b opposite the distal outer surface 1322 and defining at least in part a distal recess 1325.

In the illustrated embodiment, an entirety of the distal inner surface 1326b includes a texture 1340. In some embodiments, only a portion of the distal inner surface 1326b includes the texture 1340. In some embodiments, the texture 1340 is included on other surfaces of the ocular member 1320 in addition to or instead of the distal inner surface 1326b. The texture 1340 can comprise a plurality of protrusions from a base surface such that the distal inner surface (or a portion thereof) is an uneven surface that is roughened or non-smooth. The texture 1340 can be molded onto the relevant surface of the device 1300, created through chemical or physical means (e.g., etching) after the ocular member 1320 is molded and cured, or added to the surface of the cured ocular member 1320 (e.g., spattering silicone or other material in a random pattern on the relevant surface).

During operation, when the ocular member 1320 is disposed over an eye, the proximal inner surface 1328 is disposed over an anterior surface of the eye. When a light stimulus is applied, the texture 1340 can provide a light scattering effect that can enable more uniform and predictable delivery of the light stimulus to the retina within the eye, especially when the subject is not properly aligned with the stimulus source. This improved delivery of the light stimulus can result in more accurate and/or controlled measurements during electroretinography tests.

V. Electroretinography Systems and Devices Enabling an Improved Fit

Figure 14A:
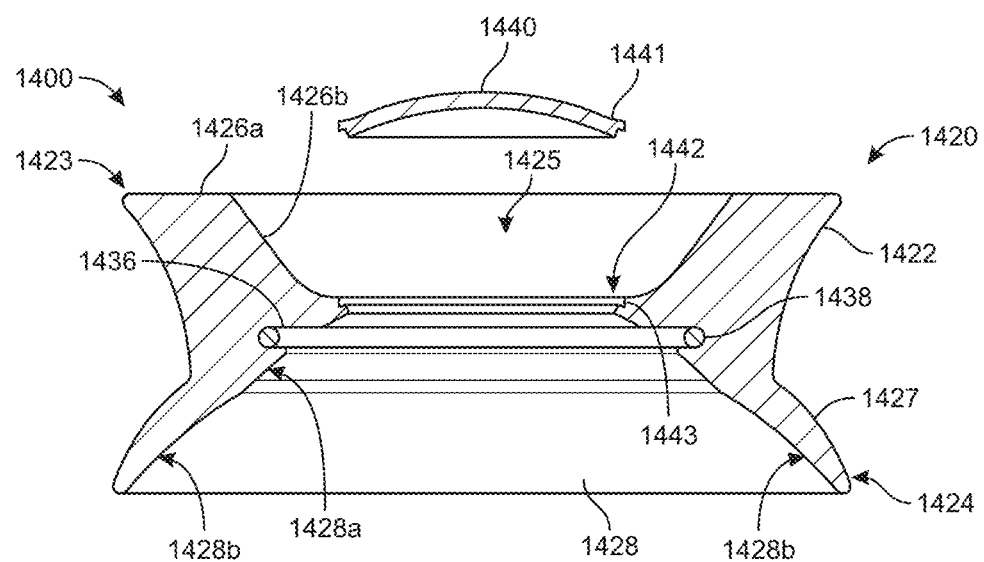
FIGS. 14A and 14B are side cross-sectional views of an electroretinography device including a lens structure in a detached and attached configuration, respectively, configured in accordance with embodiments of the present technology.
Figure 14B:
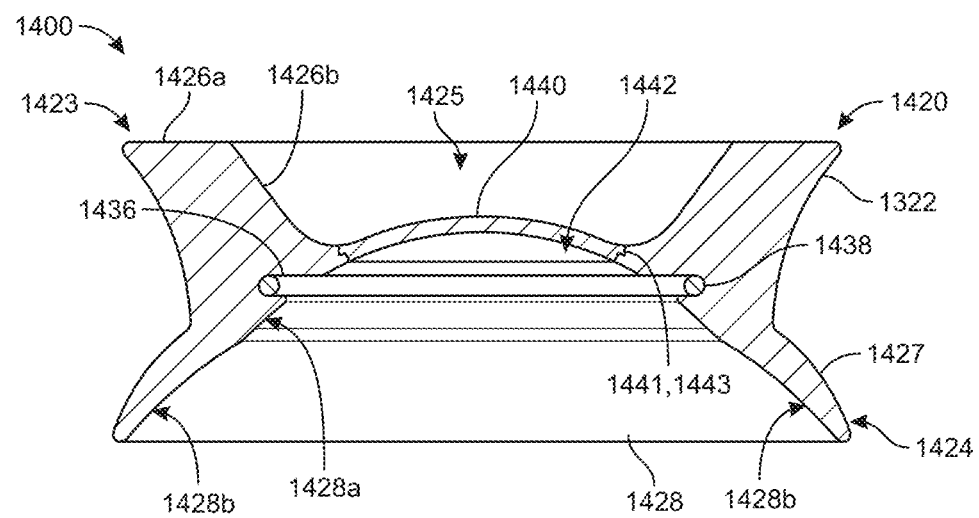

FIGS. 14A and 14B are side cross-sectional views of an electroretinography device 1400 ("device 1400") including a lens structure in a detached and attached configuration, respectively, configured in accordance with embodiments of the present technology. The device 1400 comprises an ocular member 1420 (e.g., the ocular member 120) including a proximal portion 1424 (e.g., the proximal portion 124) and a distal portion 1423 (e.g., the distal portion 123) coupled to the proximal portion 1424. The device 1400 can also include a lens structure 1440 having a curvature that is complementary or substantially complementary to a curvature of at least a portion of the subject's cornea. The device 1400 can further include a conductive element 1438 (e.g., the conductive element 138) disposed in an annular channel 1436 within the ocular member 1420 and a signal relay (not shown) (e.g., the signal relay 130) operatively connected to the conductive element.

The proximal portion 1424 comprises a proximal outer surface 1427 extending radially inward along a distal direction (e.g., from the proximal portion 1424 toward the distal portion 1423) and a proximal inner surface (e.g., the proximal inner surface 128), including a cornea portion 1428a (e.g., the cornea portion 128a), a sclera portion 1428b (e.g., the sclera portion 128b), and an optional transition zone in between (collectively referred to as "proximal inner surface 1428"), opposite the proximal outer surface 1427. The distal portion 1423 comprises a distal outer surface 1422 (e.g., the distal outer surface 122) extending radially outward in the distal direction, a distal end surface 1426a extending generally perpendicular to the distal direction, and a distal inner surface 1426b opposite the distal outer surface 1422 and defining at least in part a distal recess 1425. The distal recess 1425 can include an opening 1442 extending through the ocular member 1420 in the distal direction. The ocular member 1420 can include a lip portion 1443 at the opening 1442 that is configured to engage or otherwise receive the lens structure 1440.

Figure 15A:
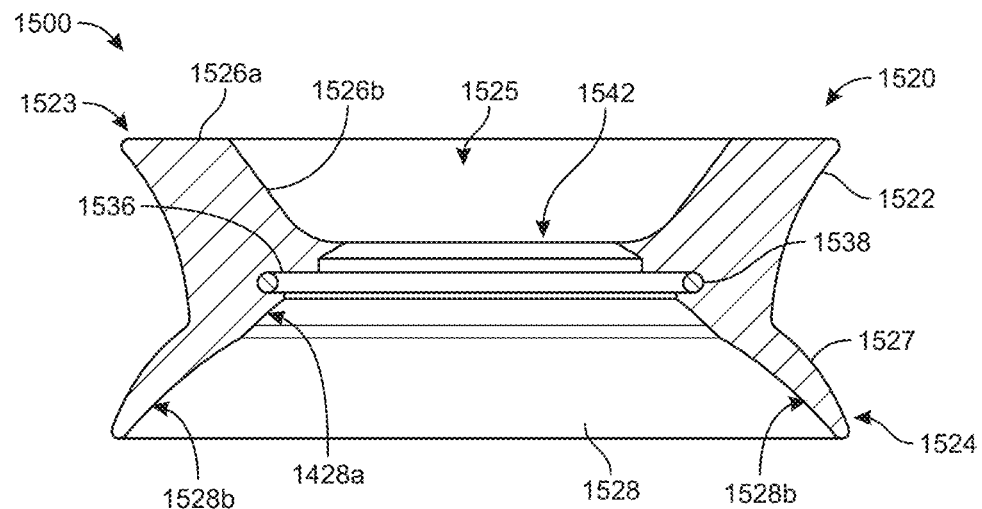
FIGS. 15A and 15B are side cross-sectional views of an electroretinography device not on and on a subject's eye, respectively, configured in accordance with embodiments of the present technology.
Figure 15B:
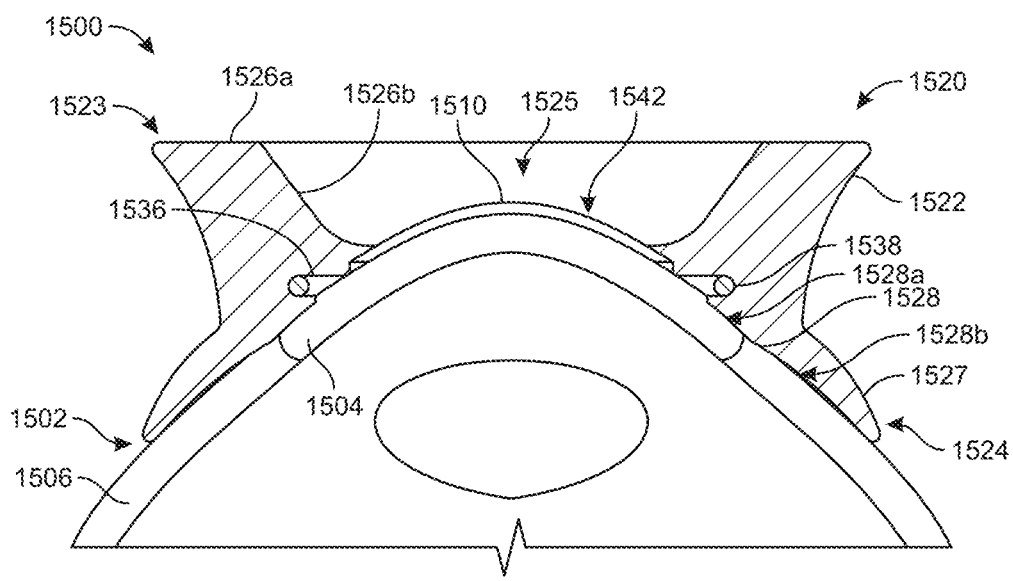

As shown by comparing FIGS. 14A and 15B, the lens structure 1440 can be configured to be removably coupled to the ocular member 1420 at the opening 1442. In some embodiments, the lens structure 1440 includes an attachment feature 1441 around a periphery of the lens structure 1440. The lens structure 1440 can be removed from the opening 1442 via various means, such as using a suction tool.

During operation, when the ocular member 1420 is disposed over an eye, the proximal inner surface 1428 is disposed over an anterior surface of the eye such that at least a portion of the cornea is exposed through the opening 1442. In some embodiments, the attachment feature 1441 and the lip portion 1443 provide a mating mechanism, such that the lens structure 1440 snaps into the opening 1442. In some embodiments, the lens structure 1440 has refractive power to correct for the subject's visual acuity. For example, the refractive power can range between −20D and +20D. In some embodiments, the opening 1442 and the lip portion 1443 are configured to receive one of a plurality of lens structures, in which each lens structure has a different curvature and/or refractive power. The modularity of the lens structure(s) can allow the same ocular member 1420 to be used for patients with varying cornea curvatures and visual acuities by swapping one lens structure 1440 for another.

FIGS. 15A and 15B are side cross-sectional views of an electroretinography device 1500 ("device 1500"), configured in accordance with embodiments of the present technology. FIG. 15A illustrates the device 1500 not in use, and FIG. 15B illustrates the device 1500 in use over a subject's eye. The device 1500 comprises an ocular member 1520 (e.g., the ocular member 120) including a proximal portion 1524 (e.g., the proximal portion 124) and a distal portion 1523 (e.g., the distal portion 123) coupled to the proximal portion 1524. The device 1500 can further include a conductive element 1538 (e.g., the conductive element 138) disposed in an annular channel 1536 within the ocular member 1520 and a signal relay (not shown) (e.g., the signal relay 130) operatively connected to the conductive element.

The proximal portion 1524 comprises a proximal outer surface 1527 extending radially inward along a distal direction (e.g., from the proximal portion 1524 toward the distal portion 1523) and a proximal inner surface (e.g., the proximal inner surface 128), including a cornea portion 1528a (e.g., the cornea portion 128a), a sclera portion 1528b (e.g., the sclera portion 128b), and an optional transition zone in between (collectively referred to as "proximal inner surface 1528"), opposite the proximal outer surface 1527. The distal portion 1523 comprises a distal outer surface 1522 (e.g., the distal outer surface 122) extending radially outward in the distal direction, a distal end surface 1526a extending generally perpendicular to the distal direction, and a distal inner surface 1526b opposite the distal outer surface 1522 and defining at least in part a distal recess 1525. The distal recess 1525 can include an opening 1542 extending through the ocular member 1520 in the distal direction.

During operation, the device 1500 can be used with a subject wearing a contact lens 1510 (FIG. 15B) such that when the ocular member 1520 is disposed over an eye 1502, the cornea portion 1528a is disposed over the cornea 1504, the sclera portion 1528b is disposed over the sclera 1506, and the opening 1542 receives at least a portion of the contact lens 1510 disposed over the anterior surface of the eye 1502. In some embodiments, the opening includes a tapered edge that contacts and forms a seal around a periphery of the contact lens 1510 without exerting undue pressure on the eye. The device 1500 is advantageous in that it can be used with subjects wearing their prescribed contact lens to an electroretinography exam without the subject having to remove the contact lens and/or when performing an electroretinography exam while the subject is wearing their prescribed contact lens.

VI. Reducing Suction and Providing Tactile Feedback

Figure 16A:
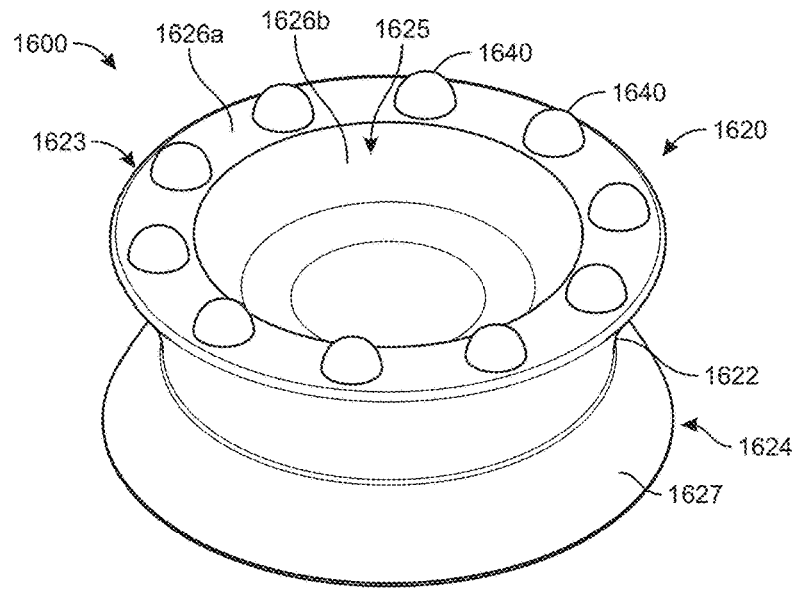
FIGS. 16A-C are top perspective, top, and side cross-sectional views, respectively, of an electroretinography device, configured in accordance with embodiments of the present technology.
Figure 16B:
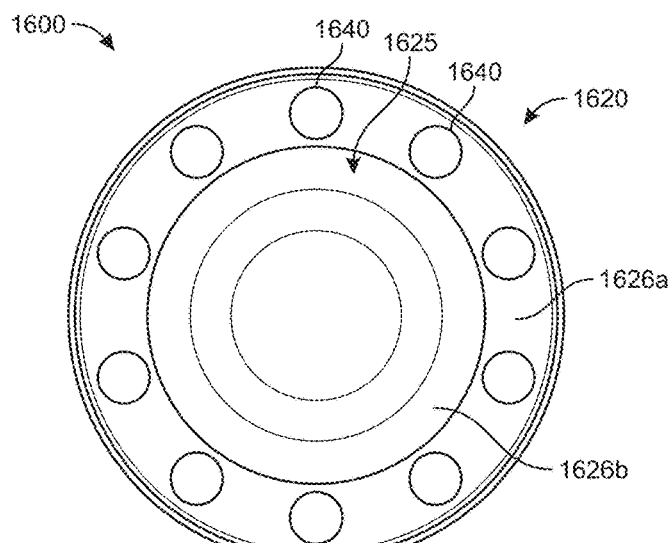
Figure 16C:
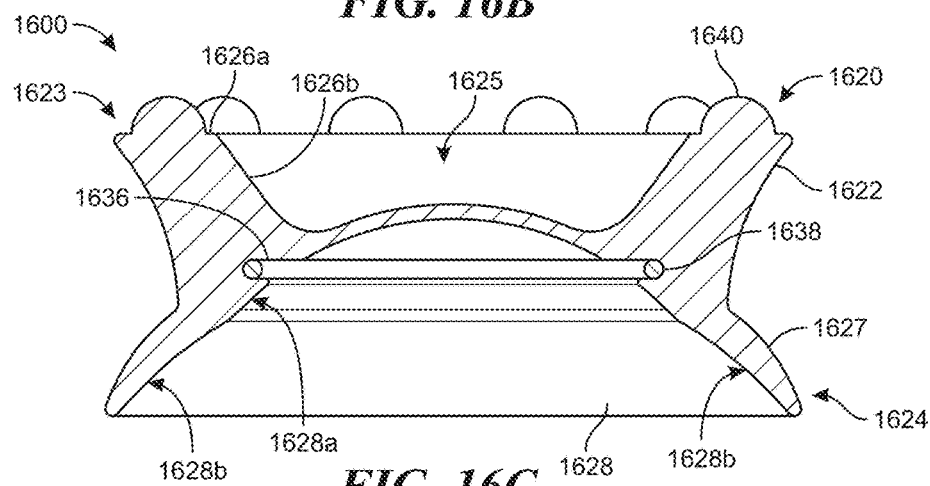

FIGS. 16A-C are top perspective, top, and side cross-sectional views, respectively, of an electroretinography device, configured in accordance with embodiments of the present technology. The device 1600 comprises an ocular member 1620 (e.g., the ocular member 120) including a proximal portion 1624 (e.g., the proximal portion 124) and a distal portion 1623 (e.g., the distal portion 123) coupled to the proximal portion 1624. The device 1600 can further include a conductive element 1638 (e.g., the conductive element 138) disposed in an annular channel 1636 (FIG. 16C) within the ocular member 1620 and a signal relay (not shown) (e.g., the signal relay 130) operatively connected to the conductive element.

The proximal portion 1624 comprises a proximal outer surface 1627 extending radially inward along a distal direction (e.g., from the proximal portion 1624 toward the distal portion 1623) and a proximal inner surface (e.g., the proximal inner surface 128), including a cornea portion 1628a (e.g., the cornea portion 128a), a sclera portion 1628b (e.g., the sclera portion 128b), and an optional transition zone in between (collectively referred to as "proximal inner surface 1628"), opposite the proximal outer surface 1627. The distal portion 1623 comprises a distal outer surface 1622 (e.g., the distal outer surface 122) extending radially outward in the distal direction, a distal end surface 1626a extending generally perpendicular to the distal direction, and a distal inner surface 1626b opposite the distal outer surface 1622 and defining at least in part a distal recess 1625.

The distal portion 1623 can include an interface feature 1640. In the illustrated embodiment, the interface feature 1640 comprises a plurality of semi-spherical bumps extending along the distal end surface 1626a. In some embodiments, the diameter or other cross-sectional dimension of the semi-spherical bumps is between 0.1-10 mm or between 1-5 mm. The bumps can be in a symmetrical and/or equally spaced apart arrangement as shown in the illustrated embodiment, or in a pattern different from the illustrated embodiment. The interface feature 1640 can include any number of bumps, such as at least one, two, three, four, five, 10, 15, or between one and 15. Individual bumps can have other shapes, such as of a pyramid, a prism, a cylinder, etc. Individual bumps can be of the same shape and/or size, or of different shapes and/or sizes. The interface feature 1640 can be introduced into the device 1600 before, during, or after formation of the ocular member 1620. For example, in some embodiments, the interface feature 1640 is placed into a mold before the material used to form the ocular member 1620 is added to the mold. In some embodiments, the interface feature 1640 is included in the mold design such that the interface feature 1640 is integral to the ocular member 1620. In some embodiments, the interface feature 1640 is added to the ocular member 1620 after a molding step (e.g., via adhesives).

The interface feature 1640 can decrease contact area with another object, such as another electroretinography device or a tool and/or inhibit different devices from sticking together at their distal or proximal edges. Without the interface feature 1640, the distal end surface 1626a can include a generally flat surface that creates a suction force when contacting another flat object, such as the distal end surface of another electroretinography device. This can cause issues when needing to isolate the device 1600, such as during a manufacturing process, a cleaning process, etc. The bumps can operate to decrease the contact area and thereby decrease the problematic suction force.

The interface feature 1640 can also be configured to provide tactile feedback to an electroretinogram testing personnel or other user handling the device 1600 with their fingers. Testing personnel may have difficulty differentiating which side of the device 1600 is to be placed onto the anterior surface of their eye given the small size of the device 1600 and the fact that an electroretinography exam may often be performed under dim light. The bumps can help the testing personnel identify which side of the device 1600 is the distal end surface 1626a (e.g., the side that should not be placed on the anterior surface of the eye). In some embodiments, the interface feature 1640 is on a proximal end surface of the ocular member 1620.

Figure 17A:
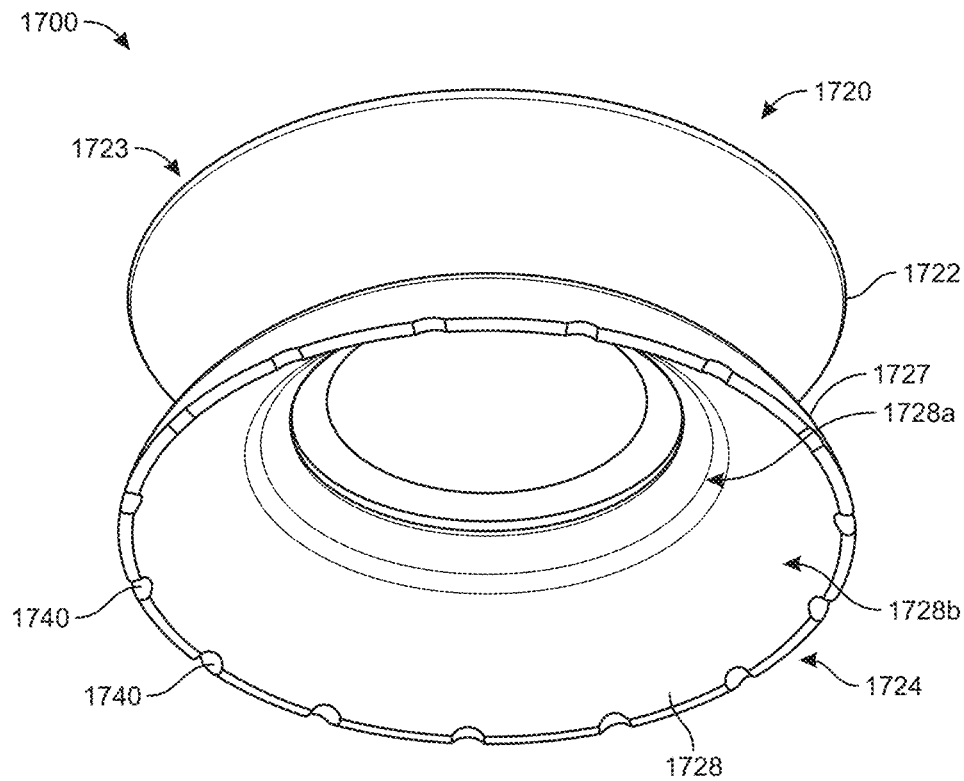
FIGS. 17A and 17B are bottom perspective and side cross-sectional views, respectively, of an electroretinography device, configured in accordance with embodiments of the present technology.
Figure 17B:
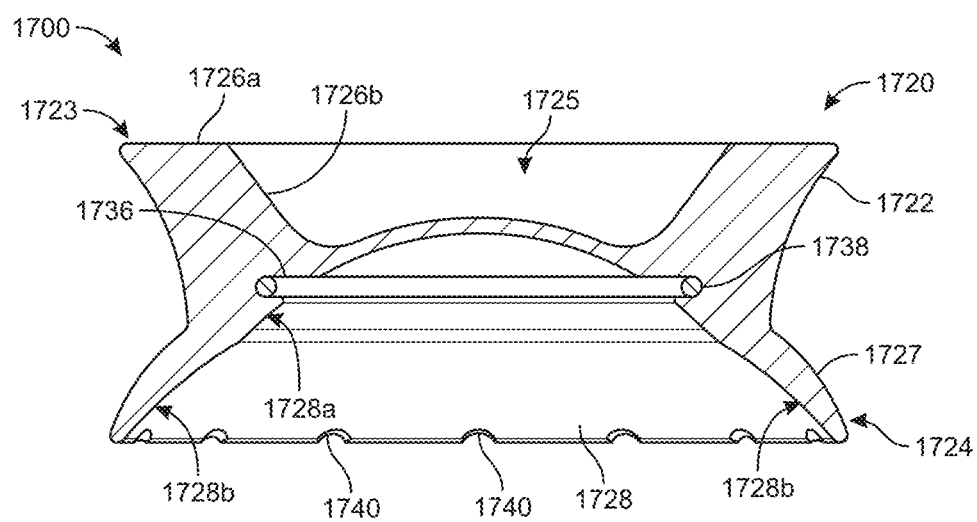

FIGS. 17A and 17B are bottom perspective and side cross-sectional views, respectively, of an electroretinography device, configured in accordance with embodiments of the present technology. The device 1700 comprises an ocular member 1720 (e.g., the ocular member 120) including a proximal portion 1724 (e.g., the proximal portion 124) and a distal portion 1723 (e.g., the distal portion 123) coupled to the proximal portion 1724. The device 1700 can further include a conductive element 1738 (e.g., the conductive element 138) disposed in an annular channel 1736 (FIG. 17B) within the ocular member 1720 and a signal relay (not shown) (e.g., the signal relay 130) operatively connected to the conductive element.

The proximal portion 1724 comprises a proximal outer surface 1727 extending radially inward along a distal direction (e.g., from the proximal portion 1724 toward the distal portion 1723), a proximal inner surface (e.g., the proximal inner surface 128), including a cornea portion 1728a (e.g., the cornea portion 128a), a sclera portion 1728b (e.g., the sclera portion 128b), and an optional transition zone in between (collectively referred to as "proximal inner surface 1728"), opposite the proximal outer surface 1727, and a proximal end surface extending between the proximal inner and outer surfaces. The distal portion 1723 comprises a distal outer surface 1722 (e.g., the distal outer surface 122) extending radially outward in the distal direction, a distal end surface 1726a extending generally perpendicular to the distal direction, and a distal inner surface 1726b opposite the distal outer surface 1722 and defining at least in part a distal recess 1725.

The proximal portion 1724 can include an interface feature 1740. In the illustrated embodiment, the interface feature 1740 comprises a plurality of notches, cutouts, or scallops (e.g., 15) extending along the proximal end surface in a symmetrical and equally spaced apart arrangement. In some embodiments, the cutouts are arranged in pattern different from the illustrated embodiment. In some embodiments, the diameter, depth, or other cross-sectional dimension of the cutouts is between 0.1-10 mm or between 1-5 mm. The interface feature 1740 can include any number of cutouts, such as at least one, five, 10, 20, 30, 40, 50, or between 1 and 50. Individual ones of the cutouts can have various shapes, such as semi-circular, rectangular, triangular, oval, etc. Individual cutouts can be of the same shape and/or size, or of different shapes and/or sizes. The interface feature 1740 can be introduced into the device 1700 before, during, or after formation of the ocular member 1720. For example, in some embodiments, the interface feature 1740 is included in the mold design before the material used to form the ocular member 1720 is added to the mold. In some embodiments, the interface feature 1740 is added to the ocular member 1720 after a molding step (e.g., removing, such as by cutting and/or carving, material from the ocular member 1720 after molding).

The interface feature 1740 can be configured to decrease contact area with another object, such as another electroretinography device or a tool. Without the interface feature 1740, the proximal end surface can include a surface that is continuous within a single plane that creates a suction force when contacting another object, such as the proximal end surface of another electroretinography device. This can cause issues when needing to isolate the device 1700, such as during a manufacturing process, a cleaning process, etc. The cutouts can operate to decrease the contact area and thereby decrease the problematic suction force.

The interface feature 1740 can also be configured to provide tactile feedback to a subject handling the device 1700 with their fingers. Subjects may have difficulty differentiating which side of the device 1700 is to be placed onto the anterior surface of their eye given the small size of the device 1700 and the fact that an electroretinography exam may often be performed under dim light. The cutouts can help the subject identify which side of the device 1700 is the proximal end surface (e.g., the side that should be placed on the anterior surface of the eye).

Figure 18:
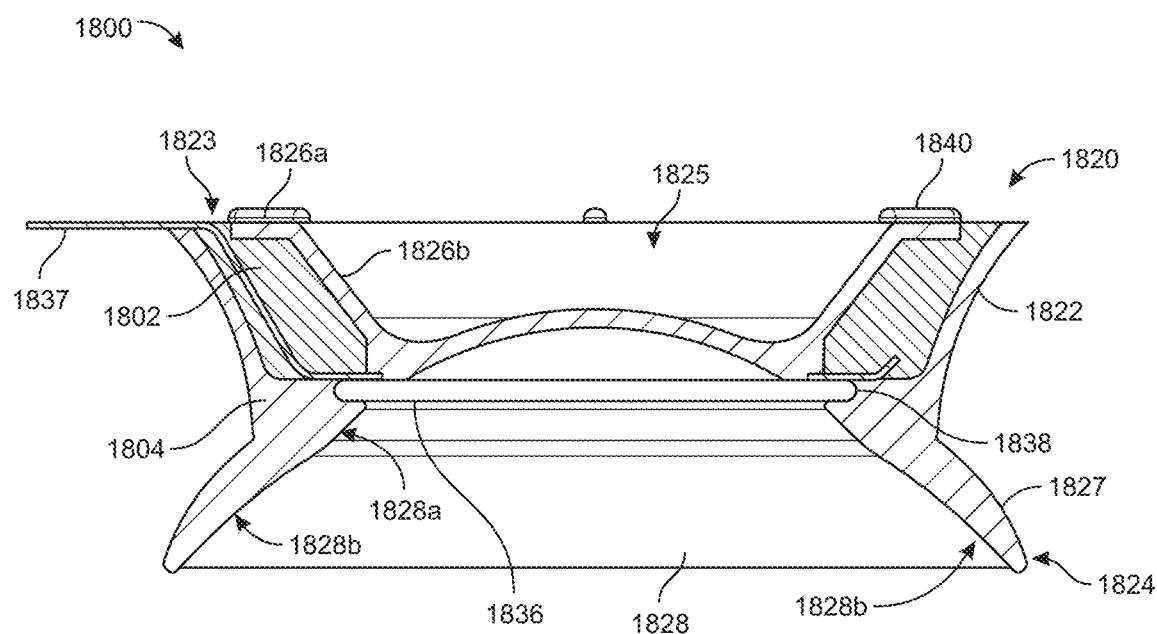
FIG. 18 is a side cross-sectional view of an electroretinography device, configured in accordance with embodiments of the present technology.

FIG. 18 is a side cross-sectional view of an electroretinography device 1800, configured in accordance with embodiments of the present technology. The device 1800 comprises an ocular member 1820 (e.g., the ocular member 120) including a proximal portion 1824 (e.g., the proximal portion 124) and a distal portion 1823 (e.g., the distal portion 123) coupled to the proximal portion 1824. The device 1800 can further include a conductive element 1838 (e.g., the conductive element 138) disposed in an annular channel 1836 within the ocular member 1820 and a signal relay 1837 (e.g., the signal relay 130) operatively connected to the conductive element 1838.

The proximal portion 1824 comprises a proximal outer surface 1827 extending radially inward along a distal direction (e.g., from the proximal portion 1824 toward the distal portion 1823) and a proximal inner surface (e.g., the proximal inner surface 128), including a cornea portion 1828*a* (e.g., the cornea portion 128*a*), a sclera portion 1828*b* (e.g., the sclera portion 128*b*), and an optional transition zone in between (collectively referred to as "proximal inner surface 1628"), opposite the proximal outer surface 1827. The distal portion 1823 comprises a distal outer surface 1822 (e.g., the distal outer surface 122) extending radially outward in the distal direction, a distal end surface 1826*a* extending generally perpendicular to the distal direction, and a distal inner surface 1826*b* opposite the distal outer surface 1822 and defining at least in part a distal recess 1825.

The distal portion 1823 can include an interface feature 1840. In the illustrated embodiment, the interface feature 1840 comprises a plurality of semi-spherical bumps (e.g., the plurality of semi-spherical bumps forming the interface feature 1640 of FIGS. 16A-16C) extending along the distal end surface 1826*a*. As discussed above with reference to FIGS. 16A-16C, the interface feature 1640 can decrease contact area with another object, such as another electroretinography device or a tool and/or inhibit different devices from sticking together at their distal or proximal edges.

In the illustrated embodiment, the ocular member 1820 comprises a non-monolithic structure that includes a first material 1802 and a second material 1804 at least partially surrounding the first material 1802 such that the first material 1802 is at least partially embedded in the second material 1802. As shown, the first material 1802 can have one or more annular structures that form a portion of the distal portion 1823 and the second material 1804 can form the remainder of the distal portion 1823 and the proximal portion 1824. In some embodiments, the first material 1802 (e.g., acrylic) has a first rigidity and the second material 1804 (e.g., silicone) has a second rigidity less than the first rigidity. Therefore, the first material 1802 can serve as a stabilizing element (e.g., the stabilizing element 340 of FIG. 3) that provides structural rigidity to the ocular member 1820, and the second material 1804 can serve as a softer, biocompatible material that can safely contact a patient's eye.

VII. Conclusion

It will be apparent to those having skill in the art that changes may be made to the details of the above-described embodiments without departing from the underlying principles of the present disclosure. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. For example, an electroretinography device configured in accordance with embodiments of the present technology can include recess features (e.g., the recess features 740 including the channels illustrated in FIGS. 7A-7D) and an opening for receiving a lens structure (e.g., the opening 1442 configured to receive the lens structure 1440 illustrated in FIGS. 14A and 14B). In another example, an electroretinography device configured in accordance with embodiments of the present technology can include a textured surface (e.g., the texture 1340 on the distal inner surface 1326*b* illustrated in FIGS. 13A-13C) and interface features (e.g., the interface feature 1640 including the plurality of semi-spherical bumps extending along the distal end surface 1626*a* illustrated in FIGS. 16A-16C). Other combinations including two, three, four, or more of the features described herein are within the scope of the present technology. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. Additionally, the term "comprising," "including," and "having" should be interpreted to mean including at least the recited feature(s) such that any greater number of the same feature and/or additional types of other features are not precluded. Furthermore, the phrase "configured to" can be interpreted to mean "positioned to" and/or "sized and shaped to."

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 11" includes any and all subranges between (and including) the minimum value of 1 and the maximum value of 11, i.e., any and all subranges having a minimum value of equal to or greater than 1 and a maximum value of equal to or less than 11, e.g., 5.5 to 11.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses (1, 2, 3, etc.) for convenience. These are provided as examples and do not limit the present technology. It is noted that any of the dependent clauses may be combined in any combination, and placed into a respective independent clause. The other clauses can be presented in a similar manner.

1. An electroretinography device configured to detect a biopotential signal from an eye of a subject, the device comprising:
   an ocular member including:
      a proximal portion comprising a proximal outer surface extending radially inward along a distal direction and a proximal inner surface opposite the proximal outer surface, wherein, when the ocular member is disposed over the eye, the proximal inner surface is disposed over an anterior surface of the eye and the proximal outer surface is positioned adjacent an eyelid of the subject, wherein the proximal inner surface includes a recess feature configured to receive tears from the eye; and
      a distal portion coupled to the proximal portion, wherein the distal portion comprises a distal outer surface extending radially outward in the distal direction, and a distal inner surface opposite the distal outer surface and defining at least in part a distal recess;
   a conductive element in an annular channel of the proximal portion; and
   a signal relay operatively connected to the conductive element and configured to transmit the biopotential signal from the conductive element to a signal processor.

2. The device of any of the clauses herein, wherein the recess feature comprises at least one groove extending along the inner surface.

3. The device of any of the clauses herein, wherein the recess feature comprises at least one groove extending along the proximal inner surface, and wherein the proximal outer surface of the proximal portion is smooth and/or does not include a groove.

4. The device of any of the clauses herein, wherein:
   the proximal inner surface includes a cornea portion and a sclera portion at a proximal-most edge extending radially around the cornea portion,
   the sclera portion has a first cross-sectional dimension and the cornea portion has a second cross-sectional dimension smaller than the first cross-sectional dimension, and
   the recess feature comprises at least one groove extending along the inner surface from the sclera portion to the cornea portion.

5. The device of any of the clauses herein, wherein the recess feature comprises at least five linear grooves spaced apart from one another along the proximal surface.

6. The device of any of the clauses herein, wherein the recess feature comprises a plurality of circular and/or concentric grooves extending along the proximal inner surface.

7. The device of any of the clauses herein, wherein the recess feature comprises a first groove extending radially along the proximal inner surface and a second concentric groove extending around the proximal inner surface.

8. The device of any of the clauses herein, wherein the recess feature comprises a first concentric groove extending along the proximal inner surface, and a second concentric groove extending along the proximal inner surface that is proximal to the first concentric groove.

9. The device of any of the clauses herein, wherein the recess feature comprises a plurality of circular grooves parallel to and concentric with the annular channel of the proximal portion.

10. The device of any of the clauses herein, wherein the recess feature comprises a series of adjacent grooves that form an undulating surface.

11. The device of any of the clauses herein, wherein the recess feature comprises a plurality of channels extending through the proximal portion from the proximal outer surface to the proximal inner surface.

12. The device of any of the clauses herein, wherein the recess feature comprises a plurality of channels extending through the proximal portion from the proximal outer surface to the proximal inner surface, and wherein the channels are spaced apart from an axis extending through a center of the ocular member by at least 4 millimeters.

13. The device of any of the clauses herein, wherein the recess feature comprises a plurality of channels extending through the proximal portion from the proximal outer surface to the proximal inner surface, and wherein the channels are arranged around the proximal portion in a predetermined pattern.

14. The device of any of the clauses herein, wherein the recess feature has a cross-sectional shape of a rectangle, circle, semicircle, or triangle.

15. The device of any of the clauses herein, wherein the recess feature comprises a texture across the proximal inner surface.

16. The device of any of the clauses herein, wherein:
the proximal inner surface includes (i) a cornea portion, (ii) a sclera portion at a proximal-most edge extending radially around the cornea portion, and (iii) a transition zone extending between the sclera portion and the cornea portion, and
the sclera portion has a first cross-sectional dimension and the cornea portion has a second cross-sectional dimension smaller than the first cross-sectional dimension.

17. An electroretinography device, the device comprising:
a proximal portion comprising a proximal outer surface extending radially inward along a distal direction and a proximal inner surface opposite the outer surface, wherein the proximal inner surface is configured to be disposed over an anterior surface of an eye of a subject, wherein the proximal outer surface is configured to be positioned adjacent an eyelid of the subject, wherein the proximal portion includes recess features configured to receive tears from the eye, the recess features including a first recess feature and a second recess feature spaced apart from the first recess feature; and
a distal portion coupled to the proximal portion, wherein the distal portion comprises a distal outer surface.

18. The device of any of the clauses herein, wherein the recess features are configured to direct the tears received from the eye to a proximal-most edge of the proximal surface along radial directions.

19. The device of any of the clauses herein, wherein at least one of the first recess feature or the second recess feature comprise a circular groove configured to trap the tears received from the eye.

20. The device of any of the clauses herein, wherein (i) the first recess feature comprises a linear groove configured to direct the tears received from the eye proximally toward a proximal-most edge of the proximal surface along radial directions and (ii) the second recess feature comprises a circular groove configured to trap the tears received from the eye.

21. The device of any of the clauses herein, wherein the recess features extend radially around the proximal inner surface.

22. The device of any of the clauses herein, wherein the first recess feature comprises a channel on the proximal inner surface and configured to direct the tears received from the eye through the proximal portion along a direction non-parallel to the distal direction, wherein the proximal outer surface does not include the recess features.

23. The device of any of the clauses herein, wherein:
the proximal inner surface includes a cornea portion and a sclera portion at a proximal-most edge extending radially around the cornea portion,
the sclera portion has a first cross-sectional dimension and the cornea portion has a second cross-sectional dimension smaller than the first cross-sectional dimension, and
at least one of the first recess feature or the second recess features comprise a channel configured to direct the tears received from the eye through the proximal portion from the sclera portion.

24. The device of any of the clauses herein, wherein:
the proximal inner surface includes a cornea portion and a sclera portion at a proximal-most edge extending radially around the cornea portion,
the sclera portion has a first cross-sectional dimension and the cornea portion has a second cross-sectional dimension smaller than the first cross-sectional dimension, and
at least one of the first recess feature or the second recess feature comprise a channel configured to direct the tears received from the eye through the proximal portion from the cornea portion.

25. The device of any of the clauses herein, wherein:
the proximal inner surface includes a cornea portion and a sclera portion at a proximal-most edge extending radially around the cornea portion,
the sclera portion has a first cross-sectional dimension and the cornea portion has a second cross-sectional dimension smaller than the first cross-sectional dimension, and
at least one of the first recess feature or the second recess feature comprise a texture across the proximal inner surface exclusive of the cornea portion.

26. The device of any of the clauses herein, wherein the distal portion further comprises a distal inner surface opposite the distal outer surface and defining at least in part a distal recess.

27. An electroretinography device configured to detect a biopotential signal from an eye of a subject, comprising:
an ocular member including:
a proximal portion comprising a proximal outer surface extending radially inward along a distal direction and a proximal inner surface opposite the outer surface, wherein, when the ocular member is disposed over the eye, the proximal inner surface is disposed over an anterior surface of the eye and the proximal outer surface is positioned adjacent an eyelid of the subject; and
a distal portion coupled to the proximal portion, wherein the distal portion comprises a distal outer surface extending radially outward in the distal direction, and a distal inner surface opposite the distal outer surface and defining at least in part a distal recess, wherein at least a portion the distal inner surface is roughened or non-smooth;
a conductive element in an annular channel of the proximal portion; and
a signal relay operatively connected to the conductive element and configured to transmit the biopotential signal from the conductive element to a signal processor.

28. The device of any of the clauses herein, wherein an entirety of the distal inner surface is roughened or non-smooth.

29. The device of any of the clauses herein, wherein only a portion of the proximal inner surface is roughened or non-smooth.

30. The device of any of the clauses herein, wherein:
the proximal inner surface includes (i) a cornea portion and (ii) a sclera portion extending radially around the cornea portion, the sclera portion has a first cross-sectional dimension and the cornea portion has a second cross-sectional dimension smaller than the first cross-sectional dimension, the portion of the proximal inner surface that is roughened or non-smooth is the sclera portion, and the cornea portion comprises a smooth texture.

31. The device of any of the clauses herein, wherein the portion of the distal inner surface that is roughened or non-smooth is (i) an uneven surface and comprises a plurality of protrusions from a base surface, and (ii) configured to provide a light scattering effect to the eye upon a light stimulus being delivered to the device.

32. The device of any of the clauses herein, wherein the portion of the distal inner surface that is roughened or non-smooth is created via etching or spattering silicone.

33. The device of any of the clauses herein, further comprising a film positioned at the distal recess, wherein the film has a concave shape configured to conform to at least a portion of a cornea of the eye, wherein an intermediate portion of the film has a first transparency, and wherein a peripheral portion of the film has a second transparency less transparent than the first transparency.

34. An electroretinography device, comprising:
an ocular member configured to detect a biopotential signal from an eye of a subject, the ocular member including:
  a proximal portion comprising a proximal outer surface extending radially inward along a distal direction and a proximal inner surface opposite the proximal outer surface, wherein, when the ocular member is disposed over the eye, the proximal inner surface is disposed over an anterior surface of the eye and the proximal outer surface is positioned adjacent an eyelid of the subject;
  a distal portion coupled to the proximal portion, wherein the distal portion comprises a distal outer surface extending radially outward in the distal direction and a distal inner surface opposite the distal outer surface and defining a distal recess; and
  a film positioned at the distal recess, wherein the film has a concave shape configured to conform to at least a portion of a cornea of the eye, wherein an intermediate portion of the film has a first transparency, and wherein a peripheral portion of the film has a second transparency less transparent than the first transparency;
a conductive element in a channel of the proximal portion; and
a signal relay operatively connected to the conductive element and configured to transmit the biopotential signal from the conductive element to a signal processor.

35. The device of any of the clauses herein, wherein the intermediate portion of the film is transparent and/or comprises a transparent material, and wherein the peripheral portion of the film is opaque and/or comprises an opaque material.

36. The device of any of the clauses herein, wherein at least some of the distal portion is opaque and/or comprises an opaque material.

37. The device of any of the clauses herein, wherein the ocular member excluding the intermediate portion of the film comprises an opaque material.

38. The device of any of the clauses herein, wherein an entirety of the proximal portion comprises an opaque material.

39. The device of any of the clauses herein, wherein the peripheral portion of the film having the second transparency is configured to block at least some of a light stimulus such that the light stimulus reaches the eye primarily through the intermediate portion of the film having the first transparency.

40. An electroretinography device, comprising:
an ocular member configured to detect a biopotential signal from an eye of a subject, the ocular member including:
  a proximal portion comprising a proximal outer surface extending radially inward along a distal direction and a proximal inner surface opposite the proximal outer surface, wherein, when the ocular member is disposed over the eye, the proximal inner surface is disposed over an anterior surface of the eye and the proximal outer surface is positioned adjacent an eyelid of the subject; and
  a distal portion coupled to the proximal portion, wherein the distal portion comprises a distal outer surface and a distal inner surface opposite the distal outer surface and defining at least in part a distal recess, wherein the recess includes an opening extending through the ocular member in the distal direction;
a conductive element in an annular channel of the proximal portion; and
a signal relay operatively connected to the conductive element and configured to transmit the biopotential signal from the conductive element to a signal processor.

41. The device of any of the clauses herein, further comprising a lens structure having a curvature that is complementary to a curvature of at least a portion of a cornea of the eye.

42. The device of any of the clauses herein, further comprising a lens structure configured to be removably coupled to the ocular member at the opening.

43. The device of any of the clauses herein, wherein the ocular member includes a lip portion at the opening, and wherein the device further comprises a lens structure having an attachment feature shaped to snap into the lip portion of the ocular member.

44. The device of any of the clauses herein, wherein the opening is configured to receive one of a plurality of lens structures having varying curvatures.

45. The device of any of the clauses herein, further comprising a lens structure having a refractive power to correct for visual acuity.

46. The device of any of the clauses herein, wherein, when the ocular member is disposed over the eye, the opening is positioned to receive at least a portion of a contact lens disposed over the anterior surface of the eye.

47. The device of any of the clauses herein, wherein the ocular member includes a tapered edge around the opening, and wherein, when the ocular member is disposed over the eye, the tapered edge contacts and forms a seal around a periphery of a contact lens disposed over the anterior surface of the eye.

48. An electroretinography device, comprising:
an ocular member configured to detect a biopotential signal from an eye of a subject, the ocular member including:
  a proximal portion comprising a proximal outer surface extending radially inward along a distal direction, a proximal inner surface opposite the outer surface, and a proximal end surface extending between the proximal inner surface and the proximal outer surface, wherein, when the ocular member is disposed over the eye, the proximal inner surface is disposed over an anterior surface of the eye and the proximal outer surface is positioned adjacent an eyelid of the subject; and a distal portion coupled to the proximal portion, wherein the distal portion comprises a distal outer surface extending radially outward in the distal direction, a distal inner surface opposite the distal outer surface and defining a distal recess, and a distal end surface extending between the distal inner surface and the distal outer surface, wherein at least one of the proximal portion or the distal portion includes an interface feature configured to decrease contact area with another object;

a conductive element in an annular channel of the proximal portion; and a signal relay operatively connected to the conductive element and configured to transmit the biopotential signal from the conductive element to a signal processor.

49. The device of any of the clauses herein, wherein the interface feature comprises at least one bump positioned on the distal end surface.

50. The device of any of the clauses herein, wherein the interface feature comprises at least one semi-spherical bump positioned on the distal end surface.

51. The device of any of the clauses herein, wherein the interface feature comprises at least five bumps spaced apart along the distal end surface.

52. The device of any of the clauses herein, wherein the interface feature comprises a plurality of cutouts or scallops along the proximal end surface.

53. The device of any of the clauses herein, wherein the interface feature comprises a plurality of semi-circular cutouts or scallops along the proximal end surface.

54. The device of any of the clauses herein, wherein the interface feature comprises a plurality of cutouts or scallops along the distal end surface.

55. The device of any of the clauses herein, wherein the distal end surface extends at an angle relative to the distal direction.

56. An electroretinography device, comprising:
a proximal portion comprising a proximal outer surface extending radially inward along a distal direction, a proximal inner surface opposite the outer surface, and a proximal end surface extending between the proximal inner surface and the proximal outer surface, wherein, when the proximal portion is disposed over an eye of the subject, the proximal inner surface is disposed over an anterior surface of the eye and the proximal outer surface is positioned adjacent an eyelid of the subject; and a distal portion coupled to the proximal portion, wherein the distal portion comprises a distal outer surface, a distal inner surface opposite the distal outer surface and defining a distal recess, and a distal end surface extending between the distal inner surface and the distal outer surface, wherein the distal portion includes an interface feature configured to decrease contact area with another object adjacent to the distal portion.

57. The device of any of the clauses herein, wherein, due at least to the interface feature, the distal end surface is not planar.

58. The device of any of the clauses herein, wherein the interface feature comprises a plurality of bumps positioned on the distal end surface, wherein the bumps are configured to contact the object adjacent to the distal portion such that the distal end portion does not contact the object.

59. The device of any of the clauses herein, wherein the interface feature has a cross-sectional dimension between 1-5 millimeters.

60. The device of any of the clauses herein, wherein the interface feature comprises a plurality of bumps positioned on the distal end surface, wherein adjacent ones of the bumps are equally spaced apart along the distal end surface.

61. The device of any of the clauses herein, wherein the interface feature comprises a plurality of identically shaped and sized bumps positioned on the distal end surface.

62. The device of any of the clauses herein, wherein the interface feature comprises a plurality of bumps positioned on the distal end surface, wherein at least two of the bumps are differently shaped or sized.

63. An electroretinography device, comprising:
a proximal portion comprising a proximal outer surface extending radially inward along a distal direction, a proximal inner surface opposite the outer surface, and a proximal end surface extending between the proximal inner surface and the proximal outer surface, wherein, when the proximal portion is disposed over an eye of a subject, the proximal inner surface is disposed over an anterior surface of the eye and the proximal outer surface is positioned adjacent an eyelid of the subject; and a distal portion coupled to the proximal portion, wherein the distal portion comprises a distal outer surface, a distal inner surface opposite the distal outer surface and defining a distal recess, and a distal end surface extending between the distal inner surface and the distal outer surface, wherein the proximal portion includes an interface feature configured to decrease contact area with another object adjacent to the proximal portion.

64. The device of any of the clauses herein, wherein, due to the interface feature, the proximal end surface is not planar.

65. The device of any of the clauses herein, wherein the interface features comprises a plurality of cutouts or scallops along the proximal end surface, wherein the cutouts or scallops are configured to not contact the object adjacent to the proximal portion.

66. The device of any of the clauses herein, wherein the interface feature has a cross-sectional dimension between 1-5 millimeters.

67. The device of any of the clauses herein, wherein the interface feature comprises a plurality of cutouts or scallops along the proximal end surface, wherein adjacent ones of the cutouts or scallops are equally spaced apart along the proximal end surface.

68. The device of any of the clauses herein, wherein the interface feature comprises a plurality of identically shaped and sized cutouts or scallops along the proximal end surface.

69. The device of any of the clauses herein, wherein the interface feature comprises a plurality of cutouts or scallops along the proximal end surface, wherein at least two of the cutouts or scallops are differently shaped or sized.

We claim:

1. An electroretinography device configured to detect a biopotential signal from an eye of a subject, comprising:
an ocular member including:
a proximal portion comprising a proximal outer surface extending radially inward along a distal direction and a proximal inner surface opposite the outer surface, wherein, when the ocular member is disposed over the eye, the proximal inner surface is disposed over an anterior surface of the eye and the proximal outer surface is positioned adjacent an eyelid of the subject; and a distal portion coupled to the proximal portion, wherein the distal portion comprises a distal outer surface extending radially outward in the distal direction, and a distal inner surface opposite the distal outer surface and defining at least in part a distal recess, wherein at least a portion the distal inner surface is roughened or non-smooth, and is configured to provide a light scattering effect upon a light stimulus being delivered to the device;

a conductive element in an annular channel of the proximal portion; and a signal relay operatively connected to the conductive element and configured to transmit the biopotential signal from the conductive element to a signal processor.

2. The device of claim 1, wherein an entirety of the distal inner surface is roughened or non-smooth.

3. The device of claim 1, wherein only a portion of the distal inner surface is roughened or non-smooth.

4. The device of claim 1, wherein:
the proximal inner surface includes (i) a cornea portion and (ii) a sclera portion extending radially around the cornea portion,
the sclera portion has a first cross-sectional dimension and the cornea portion has a second cross-sectional dimension smaller than the first cross-sectional dimension,
the sclera portion is roughened or non-smooth, and
the cornea portion comprises a smooth texture.

5. The device of claim 1, wherein the portion of the distal inner surface that is roughened or non-smooth is (i) an uneven surface and comprises a plurality of protrusions from a base surface.

6. The device of claim 1, further comprising a film positioned at the distal recess, wherein the film has a concave shape configured to conform to at least a portion of a cornea of the eye, wherein an intermediate portion of the film has a first transparency, and wherein a peripheral portion of the film has a second transparency less transparent than the first transparency.

7. An electroretinography device configured to detect a biopotential signal from an eye of a subject, comprising:
an ocular member including:
a proximal portion comprising a proximal outer surface extending radially inward along a distal direction and a proximal inner surface opposite the outer surface, wherein, when the ocular member is disposed over the eye, the proximal inner surface is disposed over an anterior surface of the eye and the proximal outer surface is positioned adjacent an eyelid of the subject; and a distal portion coupled to the proximal portion, wherein the distal portion comprises a distal outer surface extending radially outward in the distal direction, and a distal inner surface opposite the distal outer surface and defining at least in part a distal recess, wherein at least a portion the distal inner surface is roughened or non-smooth;

a film positioned at the distal recess, wherein the film has a concave shape configured to conform to at least a portion of a cornea of the eye, wherein an intermediate portion of the film has a first transparency, and wherein a peripheral portion of the film has a second transparency less transparent than the first transparency;

a conductive element in an annular channel of the proximal portion; and a signal relay operatively connected to the conductive element and configured to transmit the biopotential signal from the conductive element to a signal processor.

8. The device of claim 7, wherein an entirety of the distal inner surface is roughened or non-smooth.

9. The device of claim 7, wherein only a portion of the distal inner surface is roughened or non-smooth.

10. The device of claim 7, wherein the portion of the distal inner surface that is roughened or non-smooth is an uneven surface and comprises a plurality of protrusions from a base surface.

* * * * *